US009616851B2

(12) United States Patent
Halimeh et al.

(10) Patent No.: US 9,616,851 B2

(45) Date of Patent: Apr. 11, 2017

(54) METHOD AND APPARATUS FOR RECOGNIZING DIRECTIONAL STRUCTURES ON A WINDOW PANE OF A VEHICLE

(75) Inventors: Jad Halimeh, Munich (DE); Michael Huelsen, Herdecke (DE); Roland Schmid, Stuttgart (DE); Werner Uhler, Bruchsal (DE); Annette Frederiksen, Renningen (DE); Stephan Simon, Sibbesse (DE)

(73) Assignee: ROBERT BOSCH GMBH, Stuttgart (DE)

( * ) Notice: Subject to any disclaimer, the term of this patent is extended or adjusted under 35 U.S.C. 154(b) by 405 days.

(21) Appl. No.: 14/127,069

(22) PCT Filed: May 15, 2012

(86) PCT No.: PCT/EP2012/059010

§ 371 (c)(1), (2), (4) Date: Jul. 9, 2014

(87) PCT Pub. No.: WO2012/171737

PCT Pub. Date: Dec. 20, 2012

(65) Prior Publication Data

US 2014/0321701 A1 Oct. 30, 2014

(30) Foreign Application Priority Data

Jun. 17, 2011 (DE) ........................ 10 2011 077 703

(51) Int. Cl.

| | |
|---|---|
| ***G06K 9/00*** | (2006.01) |
| ***B60S 1/08*** | (2006.01) |
| *B60S 1/38* | (2006.01) |

(52) U.S. Cl.

CPC ........... *B60S 1/0844* (2013.01); *B60S 1/0874* (2013.01); *G06K 9/00791* (2013.01); *G06K 9/00832* (2013.01); *B60S 2001/3844* (2013.01)

(58) Field of Classification Search

None

See application file for complete search history.

(56) References Cited

U.S. PATENT DOCUMENTS 6,150,927 A * 11/2000 Nesbitt ............... B60R 25/1004 180/287

2004/0201483 A1 10/2004 Stam et al.

(Continued)

FOREIGN PATENT DOCUMENTS

| | | |
|---|---|---|
| CN | 1761870 | 4/2006 |
| CN | 101449151 | 6/2009 |

(Continued)

OTHER PUBLICATIONS

International Search Report, PCT International Application No. PCT/EP2012/059010, dated Jul. 27, 2012.

*Primary Examiner* — Shefali Goradia

(74) *Attorney, Agent, or Firm* — Gerard Messina

(57) ABSTRACT

A method for recognizing directional structures on a window pane of a vehicle is described. The method includes carrying out an assessment of image points of an image of the window pane, which image points are disposed along an evaluation path, a course of the evaluation path being dependent on an expected orientation of the directional structures on the window pane. The method further includes recognizing a directional structure based on the assessment.

15 Claims, 12 Drawing Sheets illumination device
112
implementation device
100
102
106
108
110
recognition device
104
image capturing device assess image points disposed along smear point
308
recognize smear if present
310

(56) References Cited

U.S. PATENT DOCUMENTS

| | | | | |
|---|---|---|---|---|
| 2005/0206511 | A1* | 9/2005 | Heenan ................. | B60S 1/0822 340/438 |
| 2011/0273564 | A1* | 11/2011 | Seger ...................... | B60R 11/04 348/148 |
| 2012/0026318 | A1* | 2/2012 | Huelsen ................ | B60S 1/0844 348/135 |
| 2012/0026330 | A1 | 2/2012 | Huelsen et al. | |
| 2012/0113258 | A1* | 5/2012 | Fiess ......................... | B60R 1/00 348/148 |
| 2014/0241589 | A1* | 8/2014 | Weber ..................... | G06T 7/407 382/108 |

FOREIGN PATENT DOCUMENTS

| | | |
|---|---|---|
| CN | 102015384 | 4/2011 |
| CN | 102271977 | 12/2011 |
| DE | 102 54 684 | 6/2004 |
| DE | 10 2005 004 513 | 3/2006 |
| DE | 602 14 593 | 9/2007 |
| DE | 10 2009 000 003 | 7/2010 |
| DE | 10 2009 000 004 | 7/2010 |
| DE | 10 2009 041 544 | 3/2011 |
| DE | 20 2009 018 242 | 6/2011 |
| JP | 2001330559 | 11/2001 |

* cited by examiner

402
Fig. 4
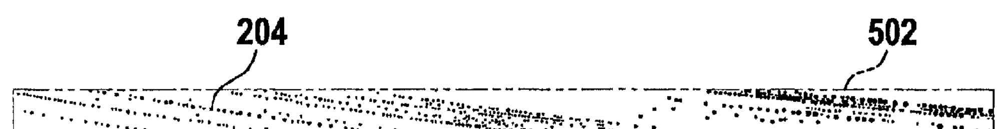
Fig. 5
104
602
Fig. 6
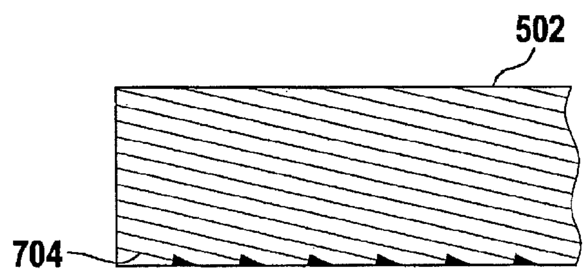
Fig. 7
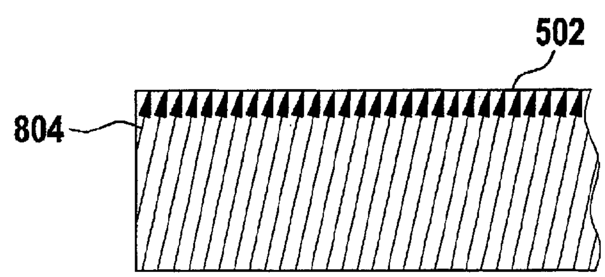
Fig. 8

204
502

204
1002

204
1102

104
204
1302

METHOD AND APPARATUS FOR RECOGNIZING DIRECTIONAL STRUCTURES ON A WINDOW PANE OF A VEHICLE

FIELD

The present invention relates to a method and an apparatus for recognizing directional structures on a window pane of a vehicle and to a corresponding computer program product.

BACKGROUND INFORMATION

Rain sensors are used in vehicles in order to recognize vehicle window panes contaminated by raindrops.

U.S. Published Application No. 2004/0201483 A1 describes an automatic control system of a vehicle. It may be used to activate a cleaning system of a window pane of the vehicle.

To detect an aging condition of a window wiper, a colored dot is printed on the wiper blade. The color changes with the aging condition. This does not, however, provide a useful measure of the particularly relevant real degree of wear of the edge of the wiper.

To produce an optical image of a window pane, an assembly such as the front camera assembly described in German Application No. DE 10 2009 000 004 A1 may be used. Such a camera may be employed to recognize a condition of a window pane, especially with regard to whether it is wetted by rain or contaminated, as described in German Patent Application No. DE 10 2009 000 003 A1.

A system for detecting the condition, or rather the degree of wear, of wiper blades of a window wiper on the basis of detected smears in a picture taken by a camera is described in German Patent Application No. DE 102 54 684 A1. However, German Patent Application No. DE 102 54 684 does not provide a technical teaching as to how the smears are detected in the image.

SUMMARY

In accordance with the present invention, a method and an apparatus are provided for recognizing directional structures on a window pane of a vehicle. A corresponding computer program product is also described.

Directional structures, for example smears, may be recognized more easily on a window pane of a vehicle if a typical course of the directional structures on the window pane is taken into consideration. In particular, the course of the directional structures may be taken into consideration in an evaluation of, for example, an image of the window pane taken by a camera.

In accordance with one embodiment of the present invention, the detection and quantification of streak-like water smears on a window pane, especially on a front window pane of a motor vehicle, is made possible. The cause of the development of such water smears is as a rule the window wiper. The water smears may lead to impairment of visibility on looking through the window pane. To capture the water smears, a camera assembly is used which captures at least a portion of the window pane surface.

The quantification of streak-like water smears may be useful for automatic activation of the window wiper.

The streak-like water smears develop during the ordinary wiping operation because the window wiper does not have the ability to convey the entire quantity of water away from the window pane without residue in one wiping cycle, that is, one outward sweep and one return sweep back into the home position. A small quantity of water remains on the window pane in the form of small water droplets or fine streaks of water. These normally evaporate within a short time, for example 300 ms. That time is greatly dependent, however, on the quantity of water, the ratio of water surface to water volume, the temperature, atmospheric humidity, wind speed on the window pane surface and on the contamination of the water, for example by dissolved road salt in winter, and possibly on further influencing variables.

The longer the residual quantity of water remains on the window pane in the form of smears after the wiping operation, the more troublesome it is.

Even though a classical rain sensor or a conventional camera-based rain sensor is still able to detect the residual amount of water by measurement, it is not advisable to start the window pane wiping cycle once more for the residual quantity since then a new residual quantity would remain and the troublesome smears would form once again.

For that reason, it may be sensible to detect and to quantify the smears separately. With the possibility thus created of distinguishing the smears from new incident raindrops, the wiper control may be configured in such a way that it is less influenced by smears and reacts in a more selective manner to raindrops.

The approach according to the present invention may be applied to other window panes that are wiped mechanically, for example in the case of ships, aircraft, an air traffic control tower, or protective screens in surveillance cameras.

In accordance with one example embodiment of the present invention, a rapid and objective assessment of the condition of the wiper blade, for example in the course of vehicle servicing, is made possible. In that operation, an objective and reproducible measure of the state of wear of the wiper is provided. To obtain true-to-life information, the state of wear is ascertained automatically during wiping operation. The vehicle may then invite the user to change the wiper. Alternatively, the information may be placed in a fault memory and called up at the next service.

A further example embodiment of the present invention is concerned with the determination of a window pane condition, a wiper condition and disturbance of visibility, using a driver assistance camera.

That may be understood as referring to an automatic and objectivized determination of the state of wear of the window wiper(s) and especially of the wiper blades. In that manner it is possible to make a contribution to traffic safety. Since the wear process in a window wiper proceeds very slowly, many drivers have difficulty in deciding the correct time for a wiper change. A correct and objective indication of a necessary wiper blade change will presumably be gratefully received by such drivers, especially if the warning occurs for the first time at a time when the wear becomes noticeable with particularly adverse effect for the driver, for example when driving in rain at night. Workshops are able to call on the automatic wear detection when they declare a wiper blade change to be necessary, for example in the course of the service.

That may also be understood as referring to the automatic and objectivized determination of the state of wear of the front window pane. The same statements apply here regarding traffic safety and the advantages of the objectivity as in the case of wear determination. Particularly in countries with a relatively high proportion of raised dust or sand, a high degree of wear of the front window pane is to be found. That wear is intensified by the use of the window wiper.

A further example embodiment of the present invention is concerned with the problem of assessing the condition of a wiper blade both in the case where wiping streaks are visually apparent and in the case where the wiping streaks are not visible to a DAS (Driver Assistance System) vision sensor owing either to great darkness in the image or to a small number of differentiating features exhibited by the wiping streaks.

That also includes the problem of assessing the condition of a windshield in operation, based on a detection of the presence of glass scratches irrespective of whether or not they are sufficiently visually pronounced for the DAS vision camera.

In accordance with one example embodiment, a system is based on a thorough understanding of the photometric properties of wiping streaks on vehicle windshields and is geared to photometric effects caused by wiping streaks. This is a considerable improvement in the respect that, even when a wiping streak is not visible in an image, its photometric effects are nevertheless visible and, owing to their unique nature, indicate the presence of such a wiping streak. For example, a wiping streak may not be visible in an image either because it is too thin in daylight or because the image was taken at night when a wiping streak cannot be recognized even when it is very thick.

In a similar manner, the detection of the presence of glass scratches is made possible by direct detection of their optical effects which mainly involve diffraction patterns that are oriented perpendicularly to the direction of movement of a wiping wiper blade. It should be pointed out that glass scratches caused by quartz particles in dusty air being rubbed over the windshield by the wiper blades over a relatively long period of time are not visible in a DAS camera since their thickness is in the microscopic range and they are blurred owing to their proximity to the DAS camera, which is generally focused at the range of infinity. On the other hand, the characteristic diffraction patterns caused by those glass scratches are reproduced well in DAS images and are therefore able to indicate the presence of glass scratches.

A further improvement is that no focusing on the windshield is required. Usually, wiping streaks provide weakly marked edges unless the camera of the driver assistance system (DAS) focuses on the windshield. That, however, would lead to further confusion owing to inner edges within the wiping streak which again are caused by a refraction of the scene by the wiping streak. One embodiment of the present invention is concerned with detection of the photometric effects of wiping streaks and glass scratches that are visible irrespective of whether or not the wiping streaks and glass scratches causing them are themselves visible in the image, while maintaining the focusing at infinity or in the range of infinity as is the case with the majority of DAS applications. Such an approach is consequently very suitable for DAS applications and renders possible a reliable and robust detection of wiping streaks and glass scratches on the vehicle windshield, thereby making it possible to assess the condition of wiper blade and windshield.

Accordingly, the diffraction and refraction properties of wiping streaks on a vehicle windshield are utilized to detect such wiping streaks and also to obtain information about what sort of condition a wiper blade is in. The diffraction pattern caused by a wiping streak or a group of wiping streaks, as is the case with a window wiper blade after wiping, is characteristic of and directly dependent on the average thickness of each individual streak of that kind and the spacing between them. This makes possible an exact determination of how worn a wiper is, based on the assumption that a perfect wiper will cause an infinitely large number of wiping streaks of an average thickness tending to zero whereas a poor wiper will cause thicker wiping streaks with a greater spacing between them.

Detection of the diffraction pattern caused by glass scratches is also used as a basis for detecting such scratches and making a corresponding assessment of the condition of the vehicle windshield. The more scratches there are on a vehicle windshield, the stronger and more pronounced are the resulting diffraction patterns. This leads to the conclusion that a vehicle windshield becomes worn as a result of extensive driving in an area of high dust density in the air.

The present invention provides an example method for recognizing directional structures on a window pane of a vehicle, which method includes the following:

carrying out an assessment of image points of an image of the window pane, which image points are disposed along an evaluation path, a course of the evaluation path being dependent on an expected orientation of the directional structures on the window pane; and recognizing a smear based on the assessment.

The vehicle may be a motor vehicle and the window pane concerned may be a front window pane or a rear window pane of the vehicle. The term "window pane" may also be understood as referring to only a sub-area of an entire window pane. In particular, it may be a window pane whose surface may be swept, and therefore cleared, by a wiping device for wiping the window pane. A directional structure may be understood as being a contaminant of elongate shape situated on the surface of the window pane. The directional structure may be a smear and may, for example, consist of water or contain water. A smear may be non-amorphous and may have an effect at a distance. The image may be understood as being a picture taken by an optical detection device. The image may also be ascertained from one or more of such pictures. For example, the image may have been taken by a camera with an image sensor, disposed near the window pane in the interior of the vehicle. Before carrying out the assessment, the image may be subjected to image processing to enhance structures in the image that are relevant for determining a directional structure and to reduce interfering structures attributable, for example, to the background. The image may be in digital form and may have a plurality of image points. Each image point may include image information representing, for example, a brightness of a region of the window pane associated with the image point. By assessing an image point, it is possible to determine whether there is contamination, for example, in the form of moisture on the surface of the window pane, in the region of the window pane associated with the image point. Suitable evaluation algorithms or image recognition algorithms may be used for the assessment.

The evaluation path may be a smear path, that is, a course of a smear. The evaluation path may also define an evaluation direction. The evaluation path may be determined in the following manner using a method that may be described by a piece of software: first, an angle is established, or rather an inclination of a straight line. Measurement of the angle or inclination is made in the image by choosing two points in the image. The two points are determined according to the wiping direction of the wiper. The wiping geometry is known. Since the wiper wipes over an arcuate line, the directional structures are correctly also arcuate. They appear quasi-straight owing to the small image detail taken by the camera on the windshield. That is to say, a fixed inclination as a straight line is a possible approximation. Thus, in an image, the inclination of the directional structures may be greater on one side of the image than the inclination of the directional structures on another side of the image. The inclination of the straight line is locally approximated. The approximation may be refined by arc segments, polygonal chains or the like instead of straight lines.

In general, the evaluation path may be a trajectory on which or parallel to which a directional structure typically extends. The evaluation path may represent a projection of a real evaluation path on the surface of the window pane into the image. Accordingly, the image points disposed along the evaluation path reproduce an image of those regions of the window pane over which a directional structure typically extends if a directional structure is present on the window pane. By analysis of the assessments of the image points along the evaluation path it is possible to determine whether or not a directional structure is situated along the evaluation path. The method may be performed for a plurality of parallel, approximately parallel, concentric or approximately concentric evaluation paths.

Accordingly, in carrying out the assessment, it may be determined whether an image point disposed along the evaluation path constitutes a contamination of a region of the window pane represented by the image point. A corresponding assessment may be carried out for all or for selected image points lying on the evaluation path.

In accordance with one embodiment, a further assessment of image points of the image of the window pane is carried out, which image points are disposed along a further path, may be carried out. In that step, a course of the further path may be approximately perpendicular to a course of the evaluation path. In the recognizing step, the directional structure may be determined based on the assessment and the further assessment. A strip-wise scanning procedure may be carried out in this case. The two paths may run in a different direction, but not through the same point. The further path and the evaluation path accordingly do not run parallel to each other. For example, the further path and the evaluation path may be oriented orthogonally to each other. In that manner, an elongate region of the window pane over which a coherent directional structure extends with a high probability may be compared with a further elongate region of the window pane over which a coherent directional structure extends with a proportionally considerably lower probability. Recognition accuracy may thereby be considerably increased.

In that procedure, a first image point disposed along the evaluation path may be associated with a further first image point situated on the further path. In the determining step, a comparison of the assessment of the first image point with the further assessment of the further first image point may be carried out. The directional structure may be recognized based on the comparison. Each image point along the evaluation path may be associated with an image point along the further path, so that a plurality of image point pairs each including different image points are formed. The comparison makes it possible, for example, to establish on which of the two paths a greater number of contaminants is recognized. If more contaminants are found on the evaluation path than on the further path, it is possible to conclude from this that the contaminants on the evaluation path may be attributed to a directional structure.

In accordance with one example embodiment, the comparison of the image points may be in a form such that refraction and/or diffraction effects, or such patterns in the image, are recognized and analyzed. A weak diffraction may indicate thick directional structures (for example wiping streaks), a weak refraction may indicate thin directional structures. The refraction or diffraction may be analyzed in dependence on the evaluation path.

In accordance with one example embodiment, the directional structures may be (fine) scratches or smears. It is therefore possible for the condition of the window pane, including also fine scratches, to be recognized. In particular, it is possible for scratches or smears to be recognized without focusing on the window pane.

In accordance with one example embodiment, the extent, especially the thickness, of the directional structures is determined. Unless purely an analysis in the direction of the evaluation path is being carried out, or conversely in order to establish/determine the evaluation path, the orientation of the directional structures may be determined. Furthermore, the spacing of the directional structures from one another may be determined, for example the spacing of the smear streaks from one another. It is also possible to extract differences, for example components of the smears, for example the thickness of the individual drops of the smear. In that manner it is possible to carry out a classification of the directional structures, for example fine smear, large smear, scratch, solid contaminant.

In accordance with one embodiment, a course of the evaluation path is dependent on a wiping trajectory of a wiping edge of a wiping device for wiping the window pane. As a result of the wiping operation, smears, for example, are usually to be expected in the wiping direction. That knowledge may be drawn upon for the image evaluation.

In accordance with one example embodiment, in a step of ascertaining, a condition of the wiping edge may be ascertained based on an item of information relating to the directional structure. The wiping device may be a window wiper and the wiping edge may be an edge of a wiper blade lying on the surface of the window pane in operation. The item of information relating to the directional structure may, for example, include data on a length, width, persistence or frequency of the directional structure. That item of information relating to the directional structure may be compared with predetermined comparison values. It is possible to ascertain therefrom whether the directional structure has been caused by the wiping edge being in a poor condition and therefore whether it should be replaced.

For that purpose, in a step of implementation, a subsequent assessment of image points of a subsequent image of the window pane, which image points are disposed along the evaluation path, may be carried out. In a step of recognizing, a subsequent directional structure may be recognized based on the subsequent assessment. In the step of ascertaining, the condition of the wiping edge may be ascertained further based on an item of information relating to the subsequent directional structure. The subsequent image may depict the same region of the window pane as the original image, but at a later point in time. The two images may have been captured between two directly consecutive wiping operations of the wiping device. In that manner it is possible to take into consideration any change in a recognized directional structure over time when ascertaining the condition of the wiping edge. That is advantageous, since directional structures caused by a wiping edge in a good condition typically disappear more rapidly than do directional structures caused by a wiping edge in a poor condition.

In accordance with one example embodiment, the method may include analyzing the image points of the image of the window pane in order to recognize fogging on an inside of the window pane. In that case, both the image points situated on the evaluation path and further image points may be analyzed. The fogging may be moisture on an inside surface of the window pane, that is, a surface of the window pane facing the interior of the vehicle. Depending on whether fogging is detected, ventilation, for example, of the window pane may be activated.

The present invention further provides an example method for recognizing directional structures on a window pane of a vehicle, which method includes:

carrying out an assessment of image points of an image of the window pane, which image points are disposed along an evaluation path, a course of the evaluation path being dependent on an expected orientation of the directional structures on the window pane;

carrying out a determination of whether an image point disposed along the evaluation path constitutes a light diffraction effect in a region of the window pane represented by the image point; and recognizing a directional structure based on the assessment and the determination.

In accordance with that example embodiment, in the determining step, it may be determined whether an image point disposed along the evaluation path constitutes a light diffraction effect in a region of the window pane represented by the image point. Light diffraction effects on the window pane are frequently caused by directional structures. In particular, light diffraction effects are also caused by directional structures that are per se invisible. By taking light diffraction effects into consideration it is therefore possible to improve the recognition accuracy regarding directional structures. Diffraction occurs in the case of thin smears. A refraction effect, on the other hand, occurs in the case of thick smears which act like cylindrical lenses.

The present invention further provides an example apparatus for recognizing directional structures on a window pane of a vehicle, including the following features:

an implementation device for carrying out an assessment of image points of an image of the window pane, which image points are disposed along an evaluation path, a course of the evaluation path being dependent on an expected orientation of the directional structures on the window pane; and a recognition device for recognizing a directional structure based on the assessment.

With the aid of the example apparatus it is possible to perform or implement the steps of the method according to the present invention in appropriate devices. This embodiment variant of the present invention in the form of an example apparatus also makes it possible to attain the object underlying the invention quickly and efficiently. In the present case, an apparatus may be understood as being an electrical device that processes sensor signals and in dependence thereon outputs control signals. The example apparatus may have an interface which may be in the form of hardware and/or software. When in the form of hardware, the interfaces may, for example, be part of a so-called system ASIC including a wide variety of functions of the apparatus. It is also possible, however, for the interfaces to be separate, integrated circuits or to consist at least partially of discrete components. When in the form of software, the interfaces may be software modules that are present, for example, on a microcontroller together with other software modules.

Also advantageous is a computer program product having program code that may be stored on a machine-readable medium, such as a semiconductor storage device, a hard disk storage device or an optical storage device and that is used for carrying out a method according to one of the above-described embodiments when the program is executed on a device corresponding to a computer.

BRIEF DESCRIPTION OF THE DRAWINGS

The present invention is described in more detail by way of example hereinafter with reference to the figures.

FIG. 4 shows a detail of an image of a window pane.

FIG. 5 shows a detail of a detection image.

FIG. 6 shows a detail of a further detection image.

FIG. 7 shows a representation of a processing of a detection image.

FIG. 8 shows a representation of a further processing of a detection image.

DETAILED DESCRIPTION OF EXAMPLE EMBODIMENTS

Figure 1:
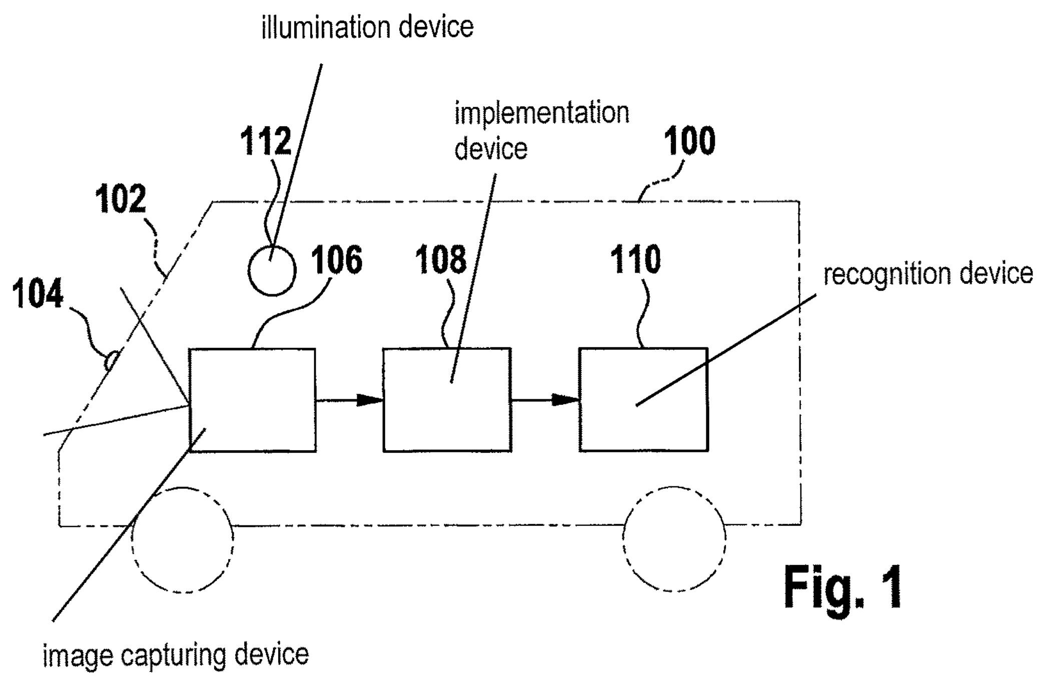
FIG. 1 shows a schematic representation of an exemplary embodiment of the present invention.

In the following description of preferred exemplary embodiments of the present invention, the same or similar reference numerals are used for the elements having a similar action that are illustrated in the various Figures, dispensing with a repeated description of those elements.

FIG. 1 shows a schematic representation of a vehicle 100, in accordance with an exemplary embodiment of the present invention. Vehicle 100 has a window pane 102 on which there is a water drop 104. The vehicle has an image-capturing device 106, an implementation device 108 and a recognition device 110. Vehicle 100 may further have an illumination device 112 for illuminating window pane 102. In accordance with this exemplary embodiment, illumination device 112 is disposed in the interior of vehicle 100 and is configured to illuminate drops 104 on the outside of window pane 102.

Image-capturing device 106 is configured to produce an image of a sub-area of window pane 102 and to make the image available to implementation device 108 via an interface. Implementation device 108 is configured to evaluate the image. For that purpose, individual image points of the image may be assessed each on its own or in relation to other image points of the image. Implementation device 108 is configured to make the result of the assessment or assessments available to recognition device 110 via a further interface. Recognition device 110 is configured to recognize a smear on window pane 102 based on the information provided by implementation device 108. In that procedure, it may be established, for example, whether drop 104 is a raindrop or alternatively drop 104 is part of a smear.

In accordance with one exemplary embodiment, a portion of window pane 102 may be captured by camera assembly 106 in a camera image or a camera image detail. Drops 104 situated on window pane 102, even very small drops 104, are visible in that image. The focusing is advantageously chosen in such a manner that drops 104 or rather edges of drops are reproduced sharply whereas the background scene which is further away appears blurred. That camera assembly 106 may optionally be supplemented by one or more active radiation sources 112 to facilitate or improve the recognizability of drops 104 or to ensure the recognizability of drops 104 even in the dark. Using an example method according to the present invention, an analysis of image (sequence) signals of aforementioned camera assembly 106 may be carried out, for example in devices 108, 110.

Figure 2:
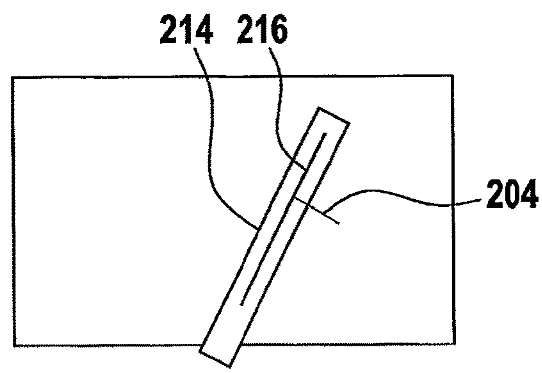
FIG. 2 shows a schematic representation of a window pane of a vehicle.

FIG. 2 shows a schematic representation of a window pane 102 of a vehicle, for example vehicle 100 shown in FIG. 1. An outside surface of window pane 102 is cleared by a wiping device 214 having a wiping edge 216. As window pane 102 has been swept by wiping edge 216, a smear 204 has remained on the surface of window pane 102 in the region just swept by the wiping edge.

Figure 3:
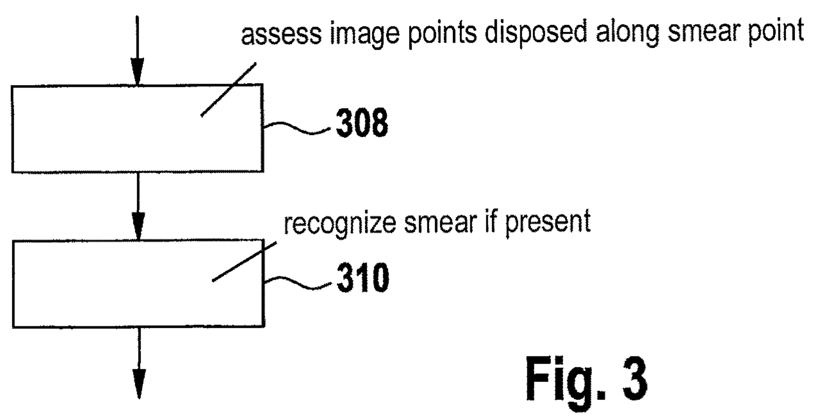
FIG. 3 shows a flow diagram of an exemplary embodiment of the present invention.

FIG. 3 shows a flow diagram of an example method for recognizing smears on a window pane of a vehicle, in accordance with an exemplary embodiment of the present invention. The steps of the example method may be carried out, for example, by the devices shown in FIG. 1. Using the example method it is possible, for example, to recognize the smear shown in FIG. 2. To do this, image points disposed along a smear path are assessed in a step 308, based on a received image of the window pane. Information regarding the course of the smear path may have been determined in advance and made available to the method. In a step 310, a smear, if present, is recognized based on the assessment carried out in step 308. Information regarding the smear may be output or stored in a memory device for later evaluation. Steps 308, 310 may be carried out repeatedly. It is also possible for a plurality of steps 308, 310 to be carried out in parallel, for example for different smear paths.

An exemplary embodiment of the present invention will be described with reference to FIGS. 4 through 8.

FIG. 4 shows an original image detail 402 of a camera assembly between the outward and return sweep of a wiper of the window pane. Image detail 402 may, for example, have been captured with the camera assembly shown in FIG. 1.

FIG. 5 shows a detection image 502 determined from original image detail 402 or a plurality of original image details by suitable image processing. In detection image 502, detected drops are shown in gray scale. In that image, black means certain detection of drops and white means that no drop is detected.

FIG. 6 shows for comparison a detection image 602 that is older than detection image 502 by 2.40 seconds and in which only raindrops that have just arrived, but no smears are visible.

Images 402, 502, 602 shown in FIGS. 4 through 6 may each be composed of a plurality of image points.

Image 402 was taken between the outward and return sweep of the wiper arm.

It will be seen that the droplets of the smears are predominantly disposed like chains along oblique lines. The shape of that line is determined by the movement trajectories of the points on the lip of the wiper blade. In the case of window wipers having a simple rotation mechanism, that is, rotation about a point as is normally the case, a point on the lip of the wiper executes a substantially arcuate movement. Owing to the inclination of the window pane relative to the camera orientation and owing to the geometric distortions along the optical path formed by window pane, refocusing optics and camera optics, the arcuate path is generally imaged into a somewhat more complex path. The direction of curvature of the arc may also be reversed.

FIG. 5 shows, however, that, owing to the relatively small sensitive surface area in this exemplary embodiment, streaks 204 run in an approximately straight line. However, the angle of the straight lines is not constant, and they are somewhat steeper here on the left than on the right.

FIG. 6 shows for comparison also an image 602 without smears. In this case, all smears had meanwhile dried and new raindrops 104 had fallen onto the sensitive surface area.

In accordance with this exemplary embodiment, the detection and quantification of streak-like water smears on the window pane is carried out, but with drops 104 like those shown in FIG. 6 not being permitted to result in a smear detection.

What appears at first to be an obvious differentiation on the basis of the size of the drops is unsuitable, since very small droplets also occur in the case of drizzle and fog.

The orientation of streaks 204 is therefore used as a differentiation criterion.

The comparison of images 502, 602 reveals that drops 104 arriving purely naturally are locally distributed in a statistically purely random fashion. There is normally no statistical dependence between the position of a first drop and the position of a second drop, except when these unite and flow into one another.

That is different, however, in the case of a drop 204 that belongs to a water smear. Along the previously known direction there is a high compound probability. If a drop is present, then the probability that further drops are to be encountered along the known direction is high. Conversely, it may be stated that if no drop is present at one location, there is also a low probability of encountering drops along the known direction.

An algorithm according to the present invention processes image 502, 602 on the basis of a criterion in two directions, a first direction approximately along the expected smear orientation and a second direction approximately perpendicular thereto.

FIG. 7 shows detection image 502 processed along the smear orientation. A path that is representative for further paths of a group 1 which are indicated by arrows is provided with reference numeral 704.

FIG. 8 shows detection image 502 processed approximately perpendicularly to the smear orientation. A path that is representative for further paths of a group 2 which are indicated by arrows is provided with reference numeral 804.

The results or intermediate results obtained by the two processing operations are then set in relation to each other. One may also speak here of two groups of paths 704, 804 along which, for example, as far as possible all pixels of detection image 502 are processed in each case.

The streak-like smears lead to two clearly different results on the two groups of paths 704, 804, whereas raindrops lead to roughly the same result irrespective of the path group. In that manner, the desired distinguishability is achieved.

In accordance with one exemplary embodiment, the following criterion may be used for that purpose. Along the respective path 704, 804, for example from group 1 shown in FIG. 7, for every pixel the detection result is compared with the detection result of the pixel that is n pixels away in the path direction. If a drop is found at both pixels, an accumulator value $a_1$ for paths 704 of group 1 is incremented, for example weighted with the spacing of the two pixels considered. This is carried out for values from n=1 through, for example, $n_{max}=20$. The choice of $n_{max}$ is governed in this case by the size of the smear droplet in image 502.

That approach works both in the case of smears composed of individual water droplets and in the case of smears composed of elongated water streaks and droplets joined to one another.

In the same manner, a second accumulator value $a_2$ is formed on paths 804 of group 2 shown in FIG. 8.

The two accumulator values are then set in relation to each other. The difference between the two accumulator values is a measure of the smearedness. To obtain a meaningful normalization, the following definition is appropriate for the smearedness s:

$$s = \frac{a_1 - a_2}{a_1 + a_2}$$

where $a_1$ represents paths 704 of group 1 along the smear orientation. If s is in a clearly positive range, the typical streak-like smears are present and more specifically are the more pronounced, the greater is the value of s. Values of s less than or close to zero may be ignored. Care should also be taken that the denominator does not become too small, for example because no drops are present, since then an evaluation is not meaningful.

Accordingly, s is therefore a suitable measure for the quantification of streak-like water smears, the orientation of the smears corresponding to an expected orientation resulting from the geometry of the arrangement.

The geometry of the arrangement may be assumed to be known. In the case of a motor vehicle, the orientations of paths 704, 804 may be calculated in advance from the design data, for example in a preliminary calibration procedure. It is also possible for the orientations to be ascertained automatically from data measured during operation, for example in an online calibration procedure.

In accordance with one exemplary embodiment, the orientations were ascertained manually from detection images on which smears were visible.

In the case of paths 704, 804, it is also irrelevant whether they are processed forward or backward since the results are identical in the exemplary embodiment proposed here.

If a second signal for quantification of the smears is available to an automatic wiper control in addition to a signal for quantification of the quantity of water on the window pane, in the case of light rain it is possible to wait, after wiping, at least until the smears have faded away before wiping again. Since the time progression of the fading process depends on many factors and is scarcely predictable, it is advantageous to measure it. By quantifying the smears and their progression with time it is also possible to improve the quantification of the new quantity of water that has been added by new drops, thereby providing the possibility of obtaining a wiping behavior that is more acceptable to the user or driver.

In accordance with this exemplary embodiment, a fixed geometric arrangement is assumed, so that the streak-like smears always have a direction that is known in advance. In particular, the position of the rotation axis of the window wiper in relation to the camera is relevant in this case. If that arrangement were changed, the smears would have a direction different from that known in advance and therefore would no longer be readily detectable.

The approach according to the present invention may be used in the case of a camera-based rain sensor that in comparison with a conventional rain sensor is expanded by detection and quantification of streak-like water smears, without significant additional costs being generated.

A further exemplary embodiment of the present invention is described below with reference to FIGS. 9 through 18. The exemplary embodiment is based on a camera-based indirect wiper condition analysis which provides a useful solution to rapid and objective determination of the state of wear of a wiper.

In addition to factors including rubber quality, contact pressure force and angle of wiper arm with respect to the window pane, the integrity of the edge of the wiper is crucial for wiping quality.

As a result of wear, fine cracks appear at the edge of the wiper and the originally sharp edges become rounded. The water is then no longer removed from the window pane completely and evenly in one wiping cycle. Smears appear on the window pane which lead to impairment of visibility.

Wear is supposedly considerably accelerated by insects on the window pane, whose hard chitin carapaces are able to damage the micro-edge, or by activation of the wiper when the window pane is iced over or when the wiper blade is frozen to the window pane.

This exemplary embodiment permits a quantitative determination of a measure of the state of wear of the wiper which is related to the extent of smear formation and hence to the variable that is relevant for the driver.

The camera-based detection and quantification of streak-like water smears on a window pane described with reference to FIGS. 4 through 8 forms the basis.

The wiping cycle consists of an outward sweep and a return sweep of the respective wiper arm. In the outward sweep, the window pane is wiped by the first edge of the wiper blade, in the return sweep by the second edge. Since, in general, the two edges exhibit different damage, their smear patterns are correspondingly different.

Accordingly, it is sensible to analyze the two smear patterns separately. At least the smear pattern after the return sweep should be analyzed since it is considerably more important for the perceived impairment of visibility since the time interval between return sweep and next outward sweep is usually considerably longer than the time interval between outward sweep and return sweep.

For a better understanding, FIGS. 9 through 13 show various detection images at successive times, produced with a suitable image-processing method. The detected drops are shown in this case in gray scale (black=certain detection, white=no drops).

Figures 9, 10, 11, 12, 13:
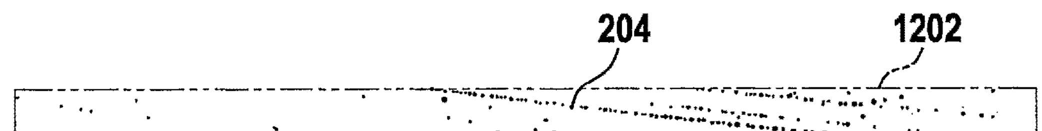
FIG. 9 shows a detail of a detection image.
FIG. 10 shows a detail of a further detection image.
FIG. 11 shows a detail of a further detection image.
FIG. 12 shows a detail of a further detection image.
FIG. 13 shows a detail of a further detection image.

FIG. 9 shows, corresponding to FIG. 5, a detection image 502 that was determined from an original image detail by suitable image processing. Smears 204 are to be seen in detection image 502. Specifically, a smear formation 400 ms after the outward sweep of the wiper, caused by the first wiper edge, is shown. On the left of image 502, the inclination of smears 204 is greater than the inclination of smears 204 on the right of image 502. This results from the arcuate path of the wiper, but a linear approximation is possible where appropriate.

FIG. 10 shows a further detection image 1002 with smears 204, 120 ms later (than FIG. 9). A smear formation 40 ms after the return sweep of the wiper, caused by the second wiper edge, is shown.

FIG. 11 shows a further detection image 1102 with smears 204. The same situation as in FIG. 10 is shown, but 200 ms after the return sweep of the wiper.

FIG. 12 shows a further detection image 1202 with smears 204. The same situation as in FIG. 11 is shown, but 600 ms after the return sweep of the wiper. A dominant smear 204 is still present.

FIG. 13 shows a further detection image 1302 with a smear 204 and raindrops 104. It is a situation at a different time. Detection image 1302 has been determined by raindrops that have newly arrived in the meantime. Although a whole second has elapsed since the last wiping cycle, a dominant smear is still present, and more specifically at the same location as in FIG. 12.

Detection image 502 shown in FIG. 9 was taken after the outward sweep of the wiper, whereas detection images 1002, 1102, 1202 shown in FIGS. 10 through 12 were captured after the return sweep immediately following it. It is clearly apparent that the smear patterns of outward and return sweep differ.

On careful consideration of images 1002, 1102, 1202, which were taken at time intervals of 40 ms, 200 ms and 600 ms after the return sweep of the wiper, it will be seen how the small droplets gradually evaporate whereas the larger droplets persist for longer.

The volume of water that evaporates from a drop per unit of time is roughly proportional to the air-water surface of the drop. Accordingly, the time until complete evaporation is approximately proportional to the thickness of the drop.

A good, new window wiper leaves behind only very small droplets on the window pane, which evaporate correspondingly quickly. Visibility through the window pane is therefore undisturbed again shortly after the wiping operation.

A window wiper with cracks and other damage to the wiping edge leaves behind droplets of greater or lesser size. These arrange themselves preferentially in lines on the window pane, more specifically along the movement trajectory of the respective crack over the window pane. Now and then, the droplets are also combined with one another and form water streaks.

Image 1202 shown in FIG. 12 reveals that, even after 600 ms, a dominant smear 204 has still hardly evaporated, whereas most of the smaller smears have already disappeared.

At a different time, with slightly heavier precipitation, image 1302 shown in FIG. 13 was taken, and more specifically one second after the return sweep of the wiper. It will be seen that, here too, a dominant smear 204 is still situated at the same location as in image 1202.

Damage to the wiper leads, therefore, to locally persistent smears. That fact may optionally be utilized in the analysis.

Figure 14:
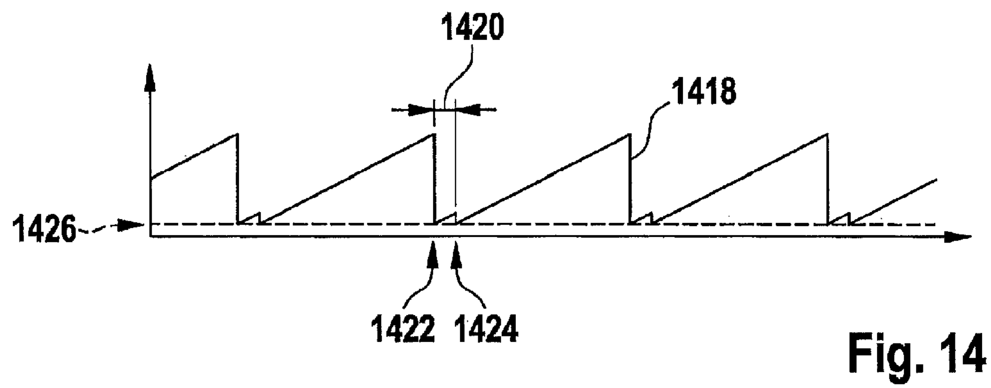
FIG. 14 shows a graphical representation of a quantity of rain on a window pane.

FIG. 14 shows a time plot of rain quantity 1418 on the window pane. A measuring curve may be involved here. Time is plotted on the abscissa and a measure of the quantity of rain is plotted on the ordinate. What emerges is a wiping cycle 1420 which is delimited by an outward sweep 1422 and a subsequent return sweep 1424. After outward sweep 1422, rain quantity 1418 increases starting from a residual quantity 1426 which remains constant over time, in order to be reduced to residual quantity 1426 again by return sweep 1424. After return sweep 1424, rain quantity 1418 increases again starting from residual quantity 1426 in order finally to be reduced to residual quantity 1426 again by outward sweep 1422.

FIG. 14 shows a typical time plot of a rain quantity 1418 on the window pane. In wiping cycle 1420, the window pane is wiped twice in succession, in outward sweep 1422 and in return sweep 1424. In each case, a residual water quantity 1426 which is perceived as smears and which is formed by droplets of greater or lesser size remains on the window pane. Owing to that residual quantity 1426, the values do not fall below the dashed marking. At the other times, the rain quantity 1418 on the window pane increases approximately linearly, in the case of precipitation that is assumed to be constant.

Figure 15:
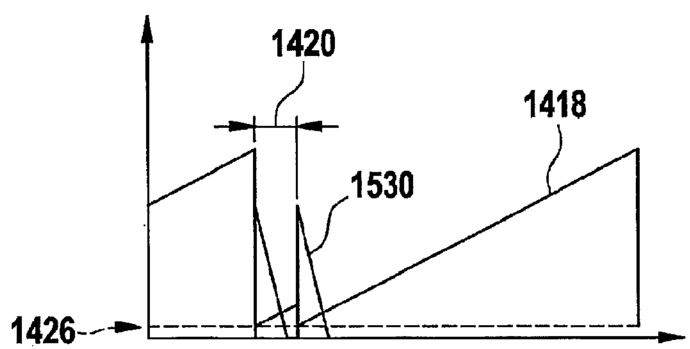
FIG. 15 shows a graphical representation of a fading behavior of smears.

FIG. 15 shows a schematic representation of the fading behavior of the smears after the outward and return sweep of the wiper blade. Curve 1530 marks a good case with one or more rapidly fading smears.

In addition to rain quantity 1418, a measure of the smearedness is also shown in the form of curve 1530, which may be ascertained in accordance with the method described with reference to FIGS. 4 through 8. It will be seen that, in the outward sweep and in the return sweep, smears are produced which, however, then quickly fade again. Impairment of visibility therefore lasts for only a brief period. Residual quantity 1426 after wiping is low. Fading takes place roughly linearly when the droplets have approximately uniform sizes.

Figure 16:
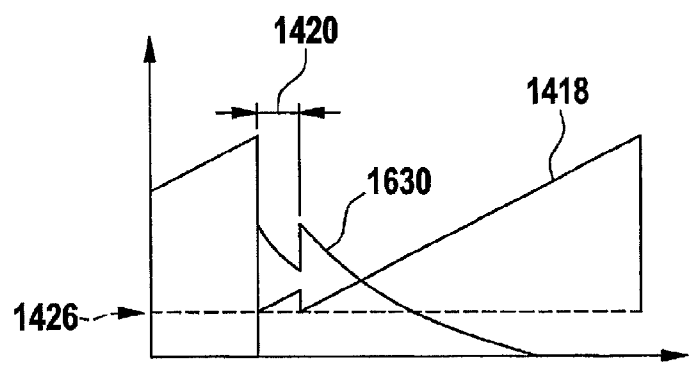
FIG. 16 shows a graphical representation of a further fading behavior of smears.

FIG. 16 shows a schematic representation of the fading behavior of the smears after the outward and return sweep of the wiper blade. Curve 1630 marks an unfavorable case with one or more slowly fading smears.

In FIG. 16, the situation proves to be considerably less favorable in terms of visibility impairment in comparison with the situation shown in FIG. 15, since the smears formed in the wiping process fade considerably more slowly. Residual quantity 1426 is also greater. The reason lies in the presence in the smears of larger drops which take more time to dry. In the case of a worn wiper blade, smaller and larger droplets are produced at the same time, with correspondingly different evaporation times. That explains the slightly concave curvature of the fading curve: initially, large and small droplets are present at the same time, resulting in steeper fading, later only relatively large droplets are present, which lead to flatter fading.

The comparison of individual fading curves 1530, 1630 from FIGS. 15 and 16 already permits a first inference to be made very quickly regarding the state of wear of the wiper blade.

For example, it is possible to use for this the fading constant with time, that is, the time or the number of image cycles required before a measure of the smearedness has decreased by a given factor.

Since the increase in wear is a very slow process which may be drawn out over many wiper operating hours, it is sensible to use the time available and to average the obtained measurements over reasonably long periods of time.

That is also particularly sensible in view of the fact that the changing environmental conditions have an effect on the fading constant. This depends, for example, on temperature, atmospheric humidity, wind speed on the surface of the window pane and/or the degree of contamination of the water, for example by dissolved road salt in winter.

For example, the average fading constant may be stored in a permanent memory at regular intervals, for example every n wiping cycles. It is then possible to carry out on the data so stored plausibility checking of the data and long-term analyses, for example moving averaging and comparison with at least one threshold value for the wear limit to ascertain recommendations therefrom for the driver or the workshop.

In addition, the driver may optionally be given feedback on how his behavior, for example manual cleaning or misuse in icy conditions, affects the condition of the wiper blades.

In accordance with one exemplary embodiment, a diversification of the smears may be carried out.

With increasing wear, a situation arises in which the persistence of the smears increases on average and so does the difference between the smears.

Figure 17:
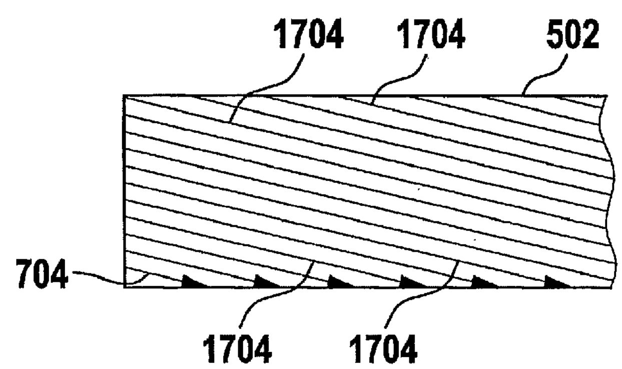
FIG. 17 shows a representation of a processing of a detection image.

In the example method described with reference to FIGS. 4 through 8, the smears are evaluated on paths approximately along the expected orientation (path group 1) and approximately perpendicular thereto (path group 2), as is shown in FIG. 17.

FIG. 17 shows detection image 502 that is processed along the smear orientation. A path that is representative for further paths of group 1 indicated by arrows is provided with reference numeral 704. Arrows 704 represent an evaluation direction, but not a smear path in the sense of actual physical smears forming a visible path.

Figure 18:
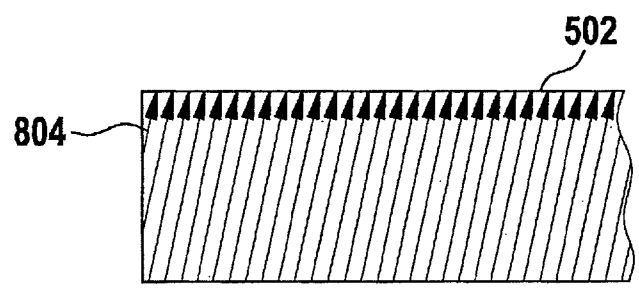
FIG. 18 shows a representation of a further processing of a detection image.

FIG. 18 shows detection image 502 that is processed approximately perpendicularly to the smear orientation. A path that is representative for further paths of a group 2 indicated by arrows is provided with reference numeral 804.

Thus, detection image 502 is processed in two directions. Once approximately along the smear orientation and once approximately perpendicularly thereto.

For analysis of the wiper blade condition it may be advantageous to divide the paths of group 1 into sub-groups, for example a first group of paths 804 along which the smears fade quickly and in which, for example, a fading constant is smaller than a threshold, and a second group of paths 1704 along which the smears fade slowly and in which, for example, a fading constant is greater than the threshold. Of the first group only one path is provided with reference numeral 804 for the sake of clarity of the figure.

The state of wear could then be determined by counting, that is, on the basis of the number of paths 1704.

Instead of selecting two groups it is also possible to select k groups and to carry out the evaluation with a histogram having k intervals. The person skilled in the art will be able to provide further solutions for evaluation with diversification of the smears.

A further exemplary embodiment of the present invention is described below with reference to FIGS. 19 through 22. The exemplary embodiment includes additional functions of a video-based rain sensor focused on the window pane.

Figure 19:
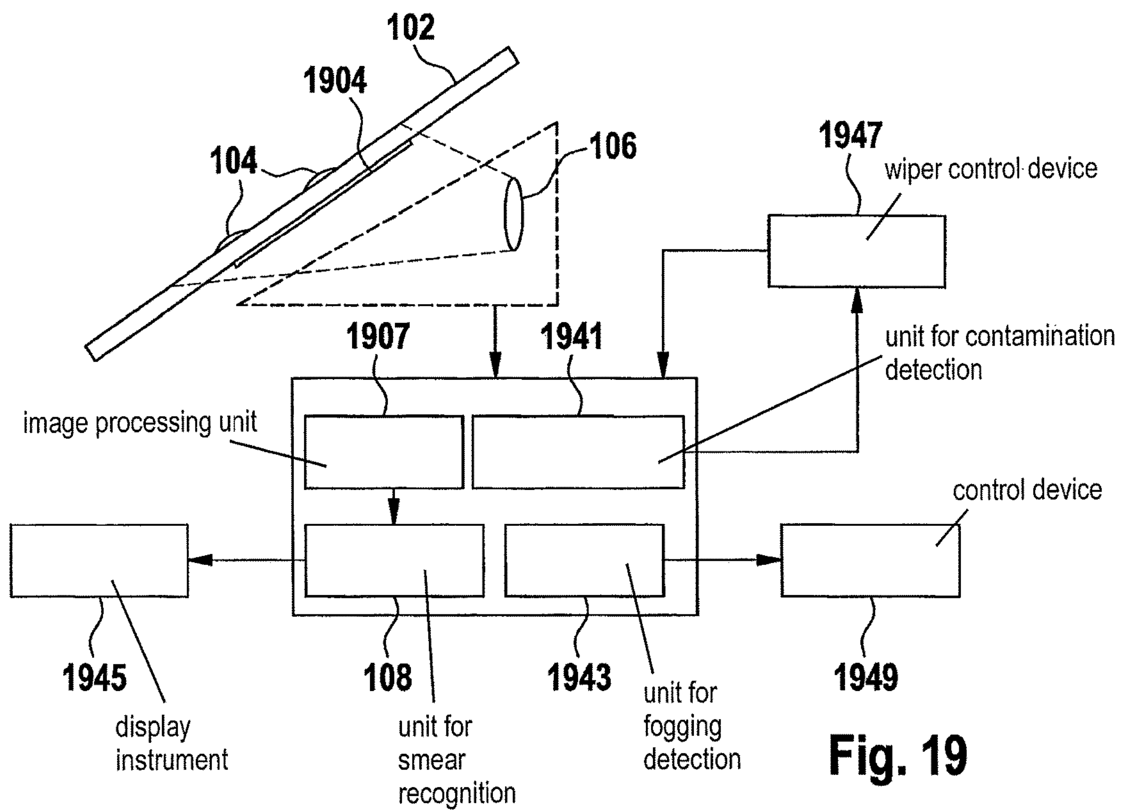
FIG. 19 shows a schematic representation of a system in accordance with an exemplary embodiment of the present invention.
Figure 20:
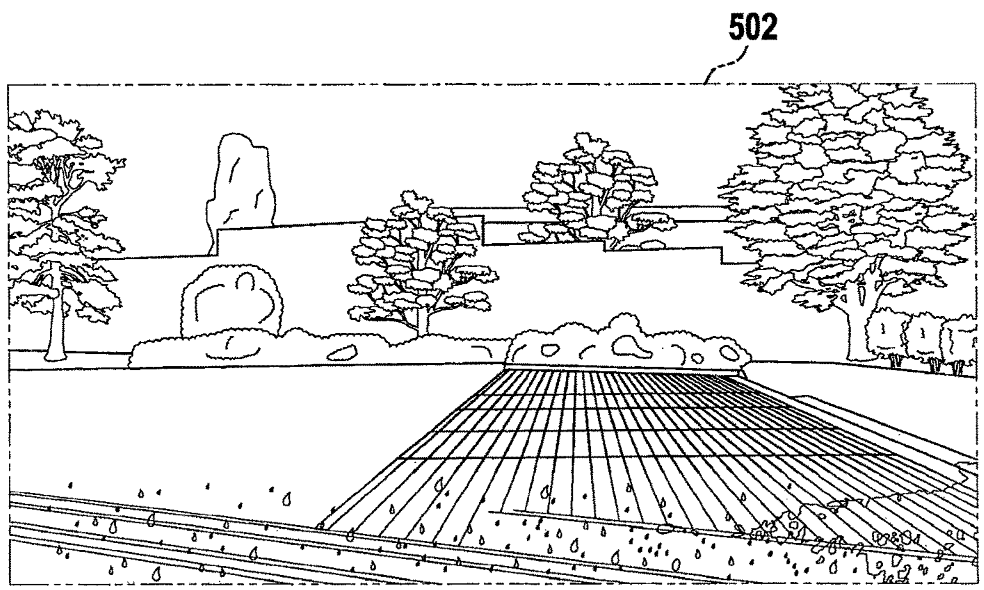
FIG. 20 shows an image of a window pane.
Figure 21:
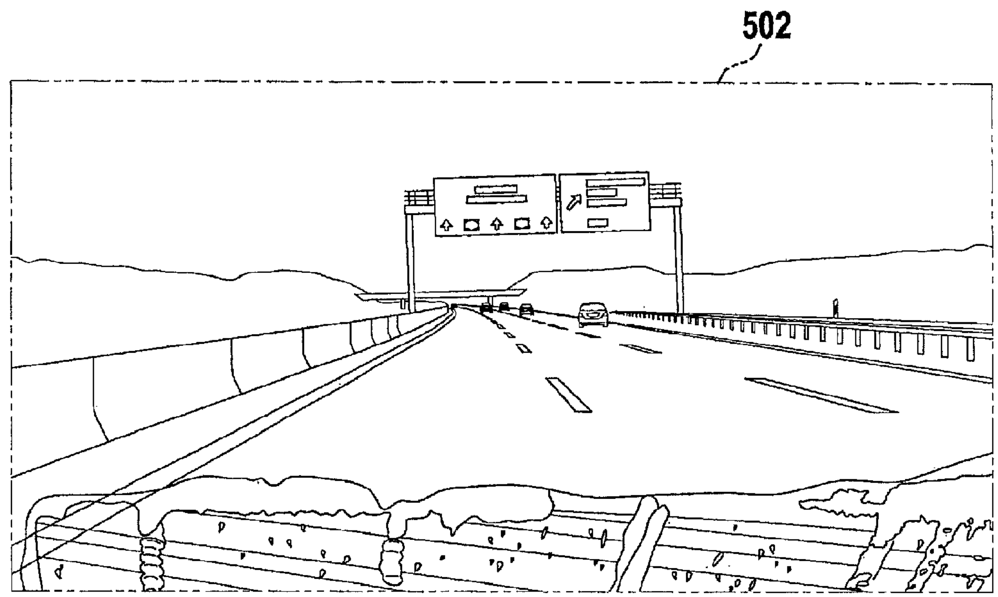
FIG. 21 shows a further image of a window pane.
Figure 22:
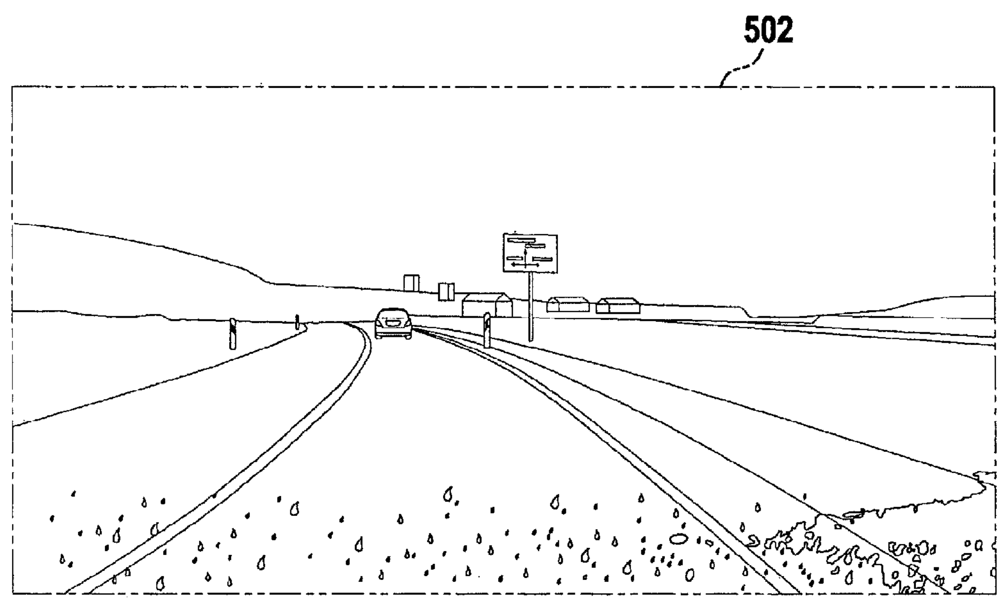
FIG. 22 shows a further image of a window pane.

FIG. 19 shows an entire system with information flows in accordance with an exemplary embodiment of the present invention. A window pane 102 and a camera 106 which is completely or partially focused on the window pane are shown. In a capture region of camera 106, a contaminant 104 or smears is/are situated on the outside of the window pane and there is fogging 1904 on the inside of the window pane. Images of window pane 102 are produced by camera 106 and output to an image processing unit. FIGS. 20 through 22 show corresponding images by way of example. The image processing unit has a unit 1907 for rain detection, a unit 108 for smear recognition, a unit 1941 for contamination detection, and a unit 1943 for fogging detection.

Unit 108 for smear recognition is configured to receive data from unit 1907 for rain detection. Unit 1907 for rain detection is configured to determine, based on the images of camera 106, whether there are raindrops 104 on window pane 102.

Unit 108 for smear recognition is configured to determine, based on the data of unit 1907 for rain detection and additionally or alternatively based on the images of camera 106, whether contaminants 104 on window pane 102 are part of a smear. Unit 108 for smear recognition is further configured to determine, based on an item of information relating to recognized smears on window pane 102, an item of information for a wiper change and to output that item of information to a display instrument 1945. Alternatively or in addition, the information relating to the wiper change is also stored in the fault memory of the vehicle. Display element 1945 may be configured to output a notification signal in response to a received item of information for a wiper change. Unit 108 for smear recognition may be configured to recognize smears in accordance with the example method described with reference to FIGS. 4 through 8 and to ascertain the information for a wiper change, which indicates a condition of the wiper, in accordance with the example method described with reference to FIGS. 9 through 18.

Unit 1941 for contamination detection is configured to determine, based on the images of camera 106, whether there is contamination 104 on window pane 102 and to output a control signal for a wipe/wash function to a wiper control device 1947 in response to recognized contamination 104. Wiper control device 1947 is in turn configured to provide to the image processing unit information relating to a wiper position and a wiper pass.

Unit 1943 for fogging detection is configured to determine, based on the images of camera 106, whether there is fogging 1904 on the inside of window pane 102 and to output to a control device 1949 of an air-conditioning system or a fan a control signal for the air-conditioning system or the fan in response to recognized fogging 1904.

FIGS. 20 through 22 show images taken, for example, by a camera shown in FIGS. 1 through 19. FIG. 20 shows a picture with smears, FIG. 21 a picture of a dirty window pane and FIG. 22 a picture with drops that have dried.

The system shown in FIG. 19 may be a video system that is carried at the front window pane and in which image processing of sharply focused regions of the window pane takes place.

Video systems are used to implement driver assistance systems, such as, for example, night vision systems or warning video systems. Those systems generally operate with rigidly mounted fixed-focus cameras focused at infinity. For certain applications, for example rain sensing or traffic sign recognition, it is desirable to obtain focusing that differs from the normal focusing plane, namely infinity. For that purpose it is possible to use a fixed-focus camera focused at a short distance. It is also possible for sub-areas to be imaged with different focus settings using an accessory or supplementary optical system.

The imaging of the entire image or of sub-areas of the captured image region with a short focus plane, typically a few cm, permits the use of that imaging information for further functions. In particular, the superimposition of a very short-focus region, which permits the surface of the windshield to be imaged in focus, may be used for further, additional functions besides rain detection.

The sharp imaging of a detail of the window pane surface on an image sensor region permits an evaluation of the sharply imaged detail of the window pane surface. In addition to rain detection, further variables such as contamination, smears or fogging may be evaluated by image processing. On the basis of those results, additional functions such as recognition of the condition of the window wiper or automatic control of the wipe/wash function may be implemented in order to ensure optimum visibility for the driver.

Focusing on the window pane permits a sharply imaged window pane detail on the image sensor or on a portion of the image sensor. In addition to being used for evaluation of the state of wetting of the window pane, for example caused by raindrops, snow or ice, that sharply imaged window pane region may also be used, for example, for acquiring further information and functions derived therefrom, as described by way of example with reference to FIG. 19.

After the images have been taken, they may be examined with regard to various features in a further processing step. The further image processing either may be directly integrated in the evaluation unit of the camera or may be carried out with an additional control device. The possible additional functions that are capable of implementation with the aid of the evaluated image data are described in more detail below.

After the pass of the window wiper, the images may be evaluated with regard to smear recognition. The pass of the window wiper may be gathered from the image data and/or may be made available as information by the wiper control device. The evaluation of the smears makes it possible to make a statement regarding the condition of the window wiper on the basis of the shape, frequency, size and behavior of the smears over time. For a more detailed analysis it is also possible to include as additional information the quantity of rain present on the window pane, which is made available by the rain detection function. In addition, the characteristic features of the smears may be stored, so that the development and change over time is included in the evaluation. The result of the smear evaluation may be used for a recommendation to change the wiper. The driver may then be informed of the poor state of the window wipers and be requested to change the wiper by a display in the instrument cluster/head-up display and by an additional acoustic warning. The driver may also be informed of the state of the window wipers by way of the on-board diagnosis interface of the vehicle, which may be read out in the workshop or by knowledgeable customers. Corresponding information may also be transmitted, for example, to a smartphone.

Furthermore, it is possible for contamination of the window pane (by dried drops, salt residues, insects etc.) to be detected. For that purpose, the pictures taken are evaluated with regard to sharply focused objects on the window pane that are not drops or snowflakes. If the size and/or number of those objects exceeds a certain threshold that restricts the visibility of the driver, automatic control of the wipe/wash function may be implemented to ensure good visibility for the driver. For this, the corresponding information is passed to the wiper control device. The success of that wipe/wash operation should be checked by image processing so as to start a second wipe/wash operation if necessary in the case of stubborn dirt. To prevent unwanted triggering of the wipe/wash function, the images must be evaluated for sharply focused objects on the window pane that do not change even after the pass of the window wiper. Those structures, for example caused by stone impact or cracks, must be recognized and their position and size stored so that they are not mistakenly recognized as rain or contamination.

A further function is able to implement the recognition of fogging on the inside of the windshield. For this, the images taken with the camera are evaluated with regard to fogging, for example in the form of small droplets in the focused region, overlying the images. When such a condition is recognized, the air-conditioning system or the fan may be controlled accordingly to eliminate the fogging and to ensure clear driver visibility. For that purpose, the corresponding command has to be sent to the controller of the air-conditioning system or fan. By constantly checking the images with regard to the development of the fogging, the air-conditioning system or fan may be optimally controlled.

Referring to FIGS. 23 through 33, determination of a window pane condition, a wiper condition and impairment of visibility using a driver assistance camera in accordance with an exemplary embodiment of the present invention is described below.

Figure 23:
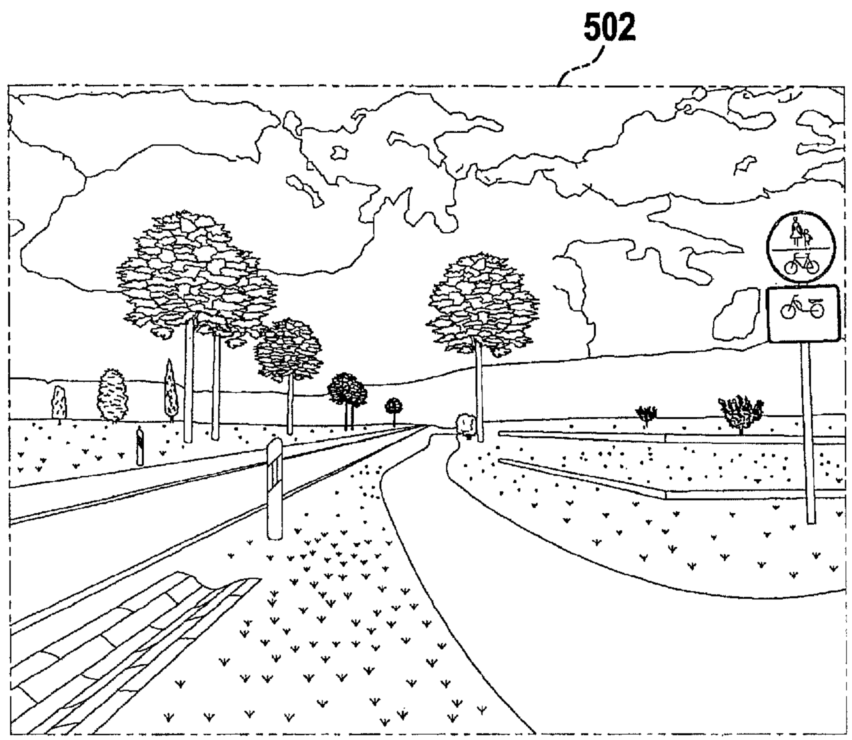
FIG. 23 shows a further image of a window pane.
Figure 24:
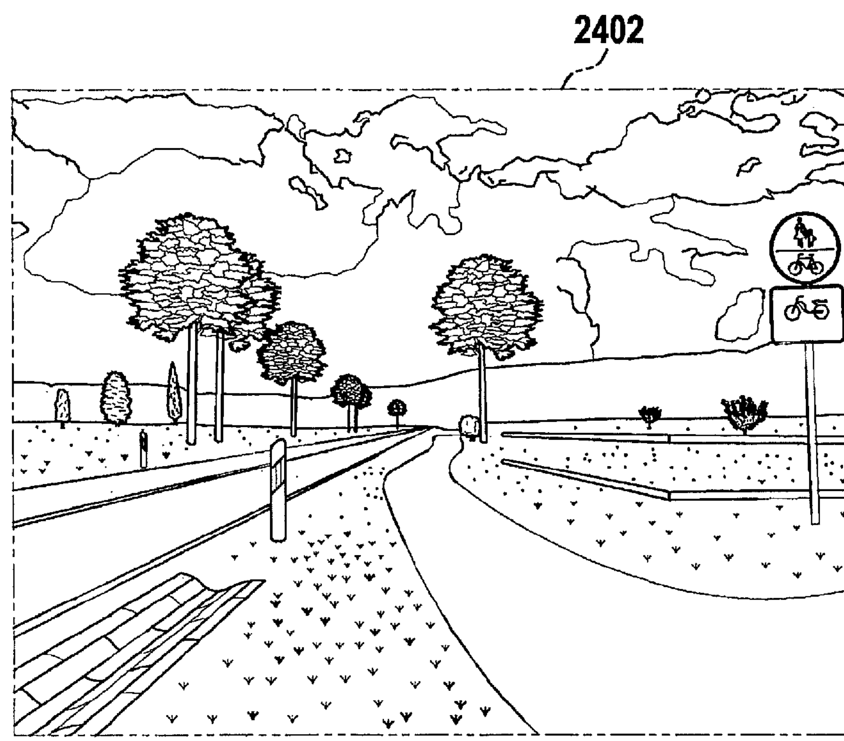
FIG. 24 shows an image of a window pane with accentuated edges.

FIGS. 23 and 24 show images 502, 2402 taken, for example, by a camera shown in FIG. 1. Image 502 shown in FIG. 23 was obtained after a wiping movement of the wiper blade. The wiping movement has left a thick wiping streak which, however, is invisible to the DAS vision camera as is confirmed by the Canny algorithm as may be seen in image 2402 shown in FIG. 24. Such invisible wiping streaks are detectable in accordance with the exemplary embodiments described below.

In particular, the detection of the presence of invisible wiping streaks or of wiping streaks that are not visually perceptible in an image of a DAS vision sensor is made possible. This is an improvement over conventional systems. Conventional systems are based merely on a detection of visible wiping streaks for assessing wiper blade condition, and that is done under the weak and often incorrect assumption that wiping streaks are visible. That this may be a weak assumption is shown by FIG. 23, where a thick wiping streak formed immediately after a wiping movement of a wiper blade in a poor condition is invisible to the DAS vision camera since such a camera is generally focused sharply at the range of infinity, as a result of which any targets on the windshield are too close and therefore are blurred or visually not pronounced enough for a detection. Image 502 is subjected to a Canny algorithm and, as will be seen in FIG. 24, no wiping streak edges are detected. Such an invisible wiping streak may be detected nevertheless, since an algorithm according to the present invention detects wiping streaks indirectly by directly detecting the optical effects that those streaks cause instead of the often uncharacteristic or invisible wiping streak edges in a universal DAS image.

In a similar manner, glass scratches caused by dust in the air which is wiped over the windshield by the wiper blades over the course of time are a clear sign of wear of a vehicle windshield. Such scratches are generally not detectable by a conventional DAS camera since their edges are blurred since conventional DAS cameras are focused at the range of infinity and not on the windshield. In accordance with the exemplary embodiments it is possible, however, to detect the characteristic optical effects caused by such glass scratches, thereby enabling their presence to be displayed.

Figure 25:
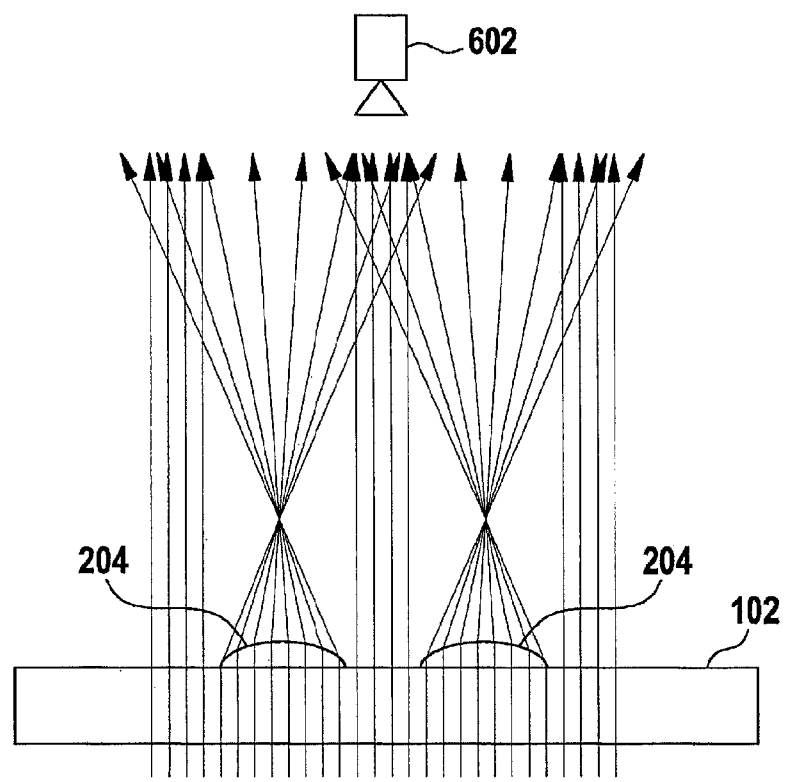
FIG. 25 shows a schematic representation of a system in accordance with an exemplary embodiment of the present invention.

FIG. 25 shows a camera assembly in accordance with an exemplary embodiment of the present invention. Shown there are a windshield 102, a DAS camera 106 and a plurality of beam paths which pass through windshield 102 and some of which are diverted by wiping streaks 204. A sketch is shown of light beams refracted by wiping streaks 204, with windshield 102 being viewed from the side. The refraction causes at every optical wavelength waves that propagate in different directions, which again leads to interference and hence to diffraction. For the sake of simplicity, the light beams are drawn perpendicularly to windshield 102.

A wiping streak 204 on a windshield 102 has the effect that light is refracted by wiping streak 204 and therefore a phase offset occurs between different points on a light wave front that is incident on windshield 102. Based on the Huygens-Fresnel principle and the interference theory (see, e.g., HECHT, Eugene: Optics. 4th edition. Reading, Mass.: Addison-Wesley Pub. Co, 2002 and BORN, M.; WOLF, E: Principles of Optics: Electromagnetic Theory of Propagation, Interference and Diffraction of Light. 7th edition. Cambridge University Press, October 1999), this leads to diffraction as is to be seen in FIG. 25. Since the wiping streaks are oriented in the wiping direction of the wiper blade, a diffraction pattern caused at a specific POI (Point of Interest) is perpendicular to that movement direction and to the wiping streaks that cause it. The intensity of that diffraction pattern is dependent on the thickness of the wiping streaks, the spacing between them and the position of the DAS camera relative to the POI. Thus, as described in DYAR, Melinda; GUNTER, Mickey E.; TASA, Dennis: Mineralogy and Optical Mineralogy. Mineralogical Society of America, 2007, when a wiper blade in a very good condition wipes over the windshield, immediately thereafter there are many parallel microscopic wiping streaks that resemble a grating structure as shown in FIG. 26, where wiping streaks that are not visible in a DAS camera are visible merely because, for demonstration purposes, the windshield was focused on, which leads to a one-dimensional diffraction pattern present at the POI perpendicular to the wiping direction.

Figure 26:
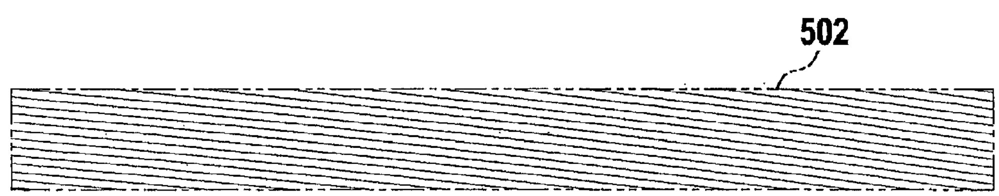
FIG. 26 shows a further image of a window pane.

FIG. 26 shows an image 502 of wiping streaks caused on the windshield by a good wiper blade, with focusing on the windshield. The constantly parallel orientation of the wiping streaks relative to the wiping direction should be noted.

On wiping, a perfect wiper blade causes a very large number of very fine wiping streaks each of which has an average thickness of almost zero and between which there is a spacing of almost zero, the tangent to a wiping streak at any desired POI on that wiping streak extending parallel to the wiping direction of the wiper blade at that point. On the other hand, a poor wiper blade also causes, on wiping, thick wiping streaks with a greater spacing between them. In general, a good wiper blade causes, on wiping, microscopically thin wiping streaks with a microscopically small spacing between them. Wiping streaks caused by a wiper blade in a poor condition are too thick and spaced too far apart to be able to show diffraction effects relative to the optical center of the DAS camera.

The better the condition of a wiper blade, the more the wiping streaks that it causes are microscopically thin and spaced at a microscopically small distance from one another. Correspondingly, based on the diffraction theory (see, e.g., HECHT, Eugene: Optics. 4th edition. Reading, Mass.: Addison-Wesley Pub. Co, 2002 and BORN, M.; WOLF, E: Principles of Optics: Electromagnetic Theory of Propagation, Interference and Diffraction of Light. 7th edition. Cambridge University Press, October 1999), the wiping streaks behave all the more like a grating structure, as a result of which the corresponding diffraction patterns caused are more pronounced. Thick wiping streaks lead, however, to weaker diffraction patterns but on the other hand provide, especially around the edges, greater refraction effects, and they lead to a blurred representation of the scene in their central portion. A blurred representation is to be observed in FIG. 23. It should be pointed out that a refraction always occurs in a wiping streak and it is precisely attributable to the refraction that a phase offset occurs at different points in the occurring wave front, which in turn leads to a diffraction. However, microscopically small wiping streaks are too thin to cause the DAS camera to recognize a refraction, and thick wiping streaks are unable to form diffraction patterns at the small distance of the DAS camera from the windshield. In other words, both a refraction and a diffraction occur irrespective of how thick a wiping streak is, but every optical effect based on the thickness of the wiping streak is characteristically distinctive, which accordingly makes a sound assessment of the wiper blade condition possible.

Quartz particles in air-borne dust cause, when rubbed over a vehicle windshield by the wiper blades, glass scratches which become more pronounced with time, as discussed in DYAR, Melinda; GUNTER, Mickey E.; TASA, Dennis: Mineralogy and Optical Mineralogy. Mineralogical Society of America, 2007 and as is to be seen in FIG. 27 where, for demonstration purposes, the image is focused on the windshield so that it is possible to see glass scratches otherwise invisible in a DAS camera image.

Figure 27:
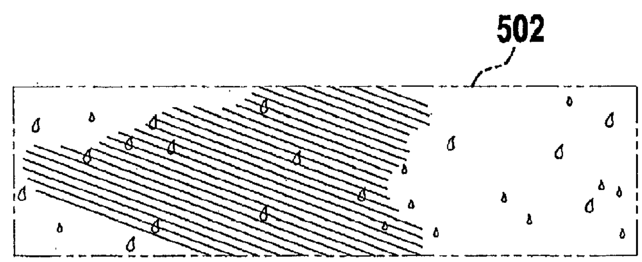
FIG. 27 shows a further image of a window pane.

FIG. 27 shows an image 502 of glass scratches on the windshield of an older vehicle. The glass scratches are oriented in the same direction as the wiping streaks, namely parallel to the wiping direction.

Such glass scratches run parallel to the wiping direction of the wiper blade and thus cause at a POI diffraction patterns extending perpendicularly to the wiping direction of the wiper blade. Such diffraction patterns are visible in a DAS camera even if the glass scratches that cause them are visually not sufficiently pronounced to show sharp edges in a DAS camera image.

If one or more of such photometric effects is/are detected in an image, there is the possibility of their having been caused by wiping streaks or glass scratches. An algorithm referred to as the Refractive-Diffractive Wiper Streak Model (ReDiWiSt) detects and recognizes such photometric effects and determines whether or not they were caused by wiping streaks or glass scratches. ReDiWiSt is based on the diffraction and refraction properties due to wiping streaks on the windshield and may also be applied to the diffraction properties resulting from glass scratches on the windshield.

If a wiper blade is in a good condition, it leaves behind after each wiping movement microscopically small wiping streaks spaced apart at a microscopically small distance, which at every given POI in the region in which, as shown in DYAR, Melinda; GUNTER, Mickey E.; TASA, Dennis: Mineralogy and Optical Mineralogy. Mineralogical Society of America, 2007, the wiper blade wipes, have a parallel curvature parallel to the wiping direction of the wiper blade. Without focusing of the lens system, such microscopically small wiping streaks are invisible to the DAS camera, as is to be seen in FIG. 28. However, their optical effects, in this case diffraction patterns, are nevertheless very pronounced visually, as may also be seen in FIG. 28. And that effect may also be observed at night, as shown in FIG. 29. Such diffraction patterns are disposed at a given POI perpendicularly to the wiping streaks that cause them.

Figure 28:
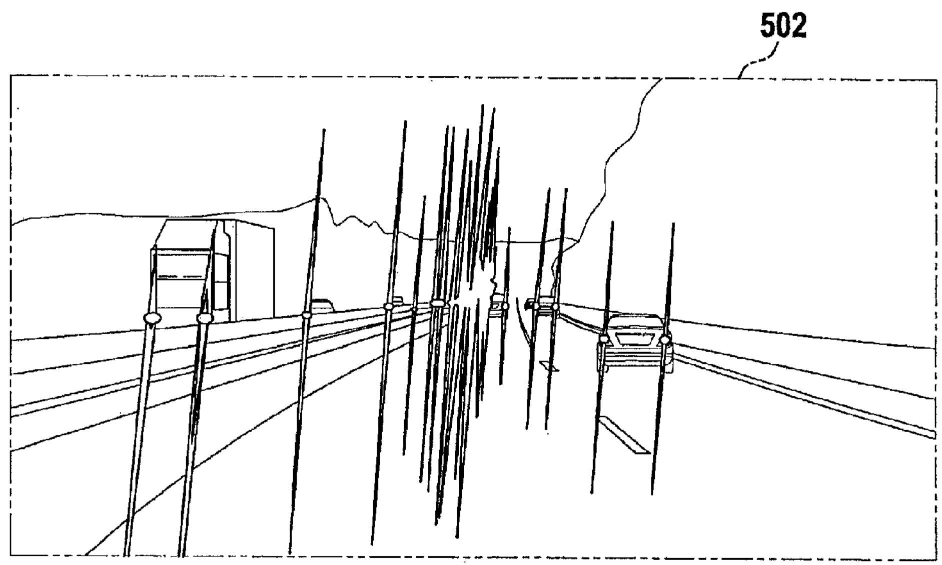
FIG. 28 shows a further image of a window pane.
Figure 29:
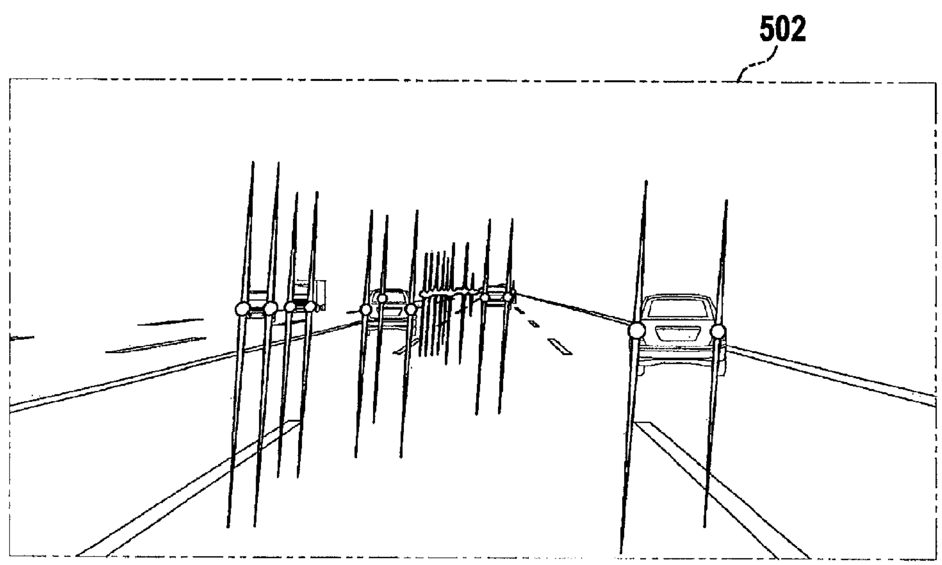
FIG. 29 shows a further image of a window pane.

FIG. 28 shows an image 502 of a windshield. A wiper blade leaves behind microscopically small wiping streaks on wiping, even when it is in a good condition. Although such streaks are invisible to a universal DAS camera, the diffraction patterns that they cause are visible.

FIG. 29 shows an image 502 of a windshield. A wiper blade in a good condition leaves behind diffraction patterns at night.

Figure 30:
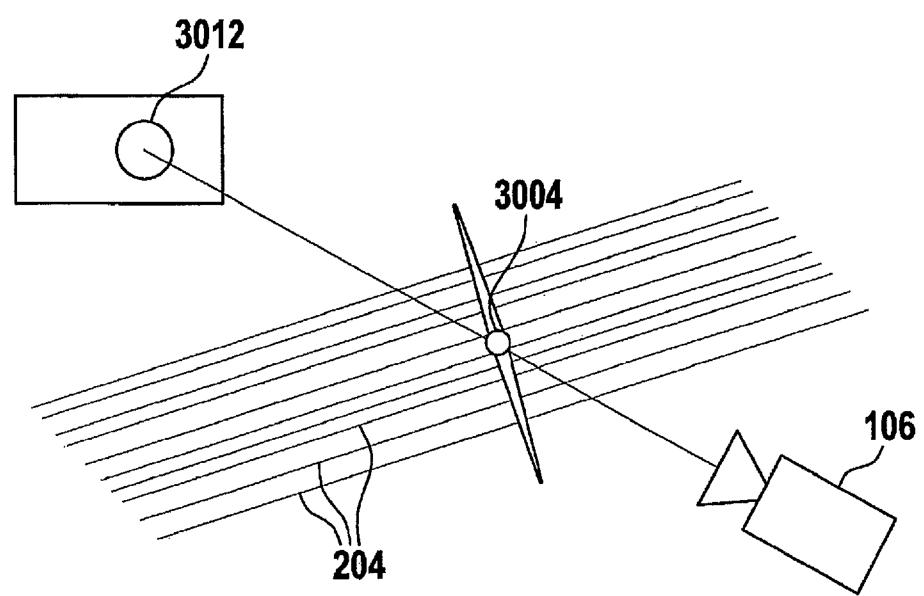
FIG. 30 shows a schematic representation of a system in accordance with an exemplary embodiment of the present invention.

FIG. 30 shows a camera assembly in accordance with an exemplary embodiment of the present invention. It shows a DAS camera 106, microscopically small wiping streaks 204, a light source 3012 and a slit diffraction 3004 of light from source 3012. Light source 3012 is situated outside of the vehicle here. Accordingly, FIG. 30 shows a slit diffraction 3004 caused by microscopically small wiping streaks 204 caused by a wiper blade in a good condition.

The type of diffraction caused by the microscopically small wiping streaks by a good wiper blade resemble (but are not identical to) a grating diffraction in which each wiping streak acts as a transparent grating tooth by which light is refracted, which leads to a phase offset at different points in the incident light wave front, which in turn leads to a diffraction. A conceptual model of that behavior is shown in FIG. 30, in which the microscopically small wiping streaks 204 spaced apart at a microscopically small distance are shown in the form of a grating geometry, and similarly in FIG. 25. It is to be noted that, in FIG. 30, diffraction pattern 3004 is perpendicular to wiping streaks 204 at the points where it intersects wiping streaks 204 (POIs). It is to be noted that, owing to the arcuate wiping movement of the wiper blade, wiping streaks 204 are not straight lines but are parallel arcs. It is pointed out that the microscopically small wiping streaks 204 illustrated in FIG. 30 would not be visible in the image captured by a DAS camera 106, but nonetheless are shown here for demonstration purposes. This has no adverse effect on that system, since, in accordance with the present invention, diffraction pattern 3004 caused by such wiping streaks 204 would nevertheless be detected and accordingly the example system would in turn intuitively detect wiping streaks 204 themselves, albeit indirectly.

In an image of a windshield, a wiper blade in a poor condition leaves behind thick wiping streaks on wiping. Such streaks are too thick for diffraction patterns to be visible, and the refraction becomes the dominant optical effect, as is apparent by reference to the diffraction patterns in the wiping streaks of a poor wiper.

A wiper blade in a poor condition causes thick wiping streaks at points in the region over which it sweeps. At such wiping streaks, the diffraction is not conspicuous and the refraction becomes the more pronounced optical effect. Thick wiping streaks refract light from a plurality of light sources situated opposite the field of view of the camera disposed inside the vehicle. If, for demonstration purposes, the windshield is focused on, the edges of the wiping streaks are visible. In the case of a universal DAS, the windshield is not focused on and those edges are visually uncharacteristic, but the refraction patterns would still be visually detectable by the DAS and by this invention. A refraction in thick wiping streaks produces optical (refraction) patterns extending along and disposed within the wiping streaks that cause them, in contrast to diffraction patterns, which are disposed perpendicular to the very thin wiping streaks that cause them.

Figure 31:
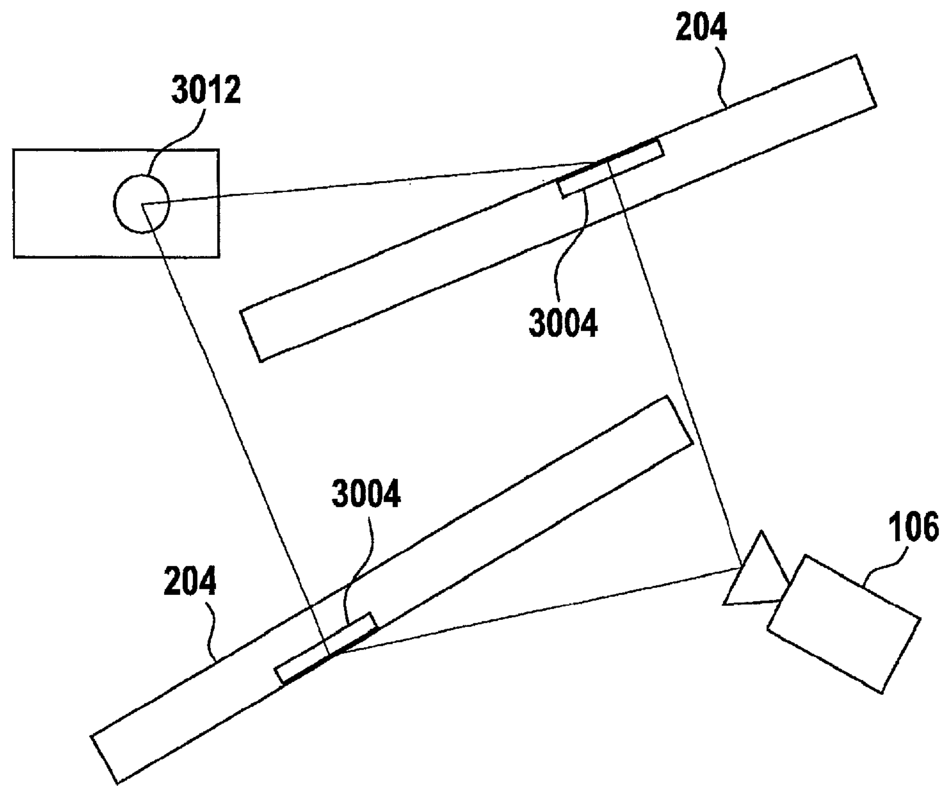
FIG. 31 shows a schematic representation of a system in accordance with an exemplary embodiment of the present invention.

FIG. 31 shows a camera assembly in accordance with an exemplary embodiment of the present invention. It shows a DAS camera 106, a light source 3012, thick wiping streaks 204, caused by a wiper blade in a poor condition, and refraction patterns 3004. Accordingly, refraction patterns 3004 caused by thick wiping streaks as a result of a wiper blade in a poor condition are shown. It is to be noted how, in contrast to diffraction patterns due to microscopically small wiping streaks, refraction patterns 3004 extend parallel to thick wiping streaks 204 which cause them, and lie within them in the image plane.

FIG. 31 accordingly shows a model of a refraction of a light from a source 3012 due to thick wiping streaks 204 caused by a wiper blade in a poor condition. The edges of a thick wiping streak 204 are bent and cause the refracted light to experience at that boundary line a considerable angular deviation based on Snell's law of refraction (see, e.g., KLINGSHIRN, Claus: Semiconductor Optics. 3rd edition. Berlin: Springer Verlag, February 2007), which has the consequence that the refraction pattern at such wiping streaks 204 shows itself in the image whereas, owing to the focusing of DAS camera 106 at the range of infinity, the wiping streak edges are visually uncharacteristic. Indeed, wiping streaks 204 themselves may well not be visible, especially at night. That does not, however, limit the scope of activity of this exemplary embodiment, since a device in accordance with this exemplary embodiment merely looks for the optical effects due to wiping streaks 204 which are caused by the wiping mechanism of the wiper blades. ReDiWiSt is based on a detection of streaks of light in the image. Based on an analysis, such streaks, when of interest, that is, when diffraction or refraction patterns due to wiping streaks are involved, extend at the corresponding POIs either perpendicular or parallel to the wiping streaks. If that condition is met, ReDiWiSt then determines whether the pattern is diffracted or refracted by determining if it is perpendicular or parallel to the wiping streak at the respective point where the pattern and the wiping streak intersect. It should be pointed out that the wiping streak may or may not be visible and that its direction is determined only as that direction which extends perpendicularly to the wiper blade at the POI.

Since the direction of a wiping streak at a given POI is parallel to the wiping direction of the wiper blade at that point, it is possible to create a lookup table or a mathematical function which is based on the mechanical configuration of the wiping mechanism of the wiper blade and its motor function. The specifications for achieving the latter two may be obtained from the manufacturer of the wiper blade system. It also takes into account a plurality of wiper blades that sweep the same region. Optionally, a time equivalent may be included in the ReDiWiSt in the form that light patterns are sought immediately after a wiping movement, since optical effects caused by wiper blades are at their most noticeable and most pronounced directly after the occurrence of the wiping mechanism. By using a time control unit which synchronizes the wiper blades with the image capture rate so that it is possible to take an image immediately after a wiping movement, a time equivalent may be obtained. That image may then be used by ReDiWiSt to detect therein optical effects caused by wiping streaks. This is optimal, though not necessary, owing to the fact that in the time that elapses between two successive wiping movements the light pattern either disappears and becomes invisible since the wiping streaks that cause it evaporate because of wind, especially in the case of diffraction but also in the case of refraction, or the thick wiping streaks, in the case of refraction, deviate from their definitive orientation, for example slip downward, and therefore do not obey the geometric laws discussed in the foregoing. Such thick wiping streaks generally remain for almost the entire time interval between two successive streaks along the same arc. This is logical in view of surface tension and a distribution of adhesive forces in connection with the windshield, as discussed in, e.g, CLIFT, Roland; GRACE, John; WEBER, Martin E.: Bubbles, Drops, and Particles. Dover Publications, January 1978). Furthermore, the diffraction patterns produced by wiping of a wiper blade persist over several individual images in a non-synchronized wiper blade system, as a result of which a time equivalent represents merely one option for the functionality of the ReDiWiSt.

Thick wiping streaks caused by a wiper blade in a poor condition are sufficiently large for refraction effects to be pronounced enough to be captured in an image obtained by a DAS camera.

In addition to causing refraction, thick wiping streaks cause a blurred representation in image 502, as shown in FIG. 23, principally owing to their proximity to the optical center of the DAS camera, since the camera is focused at the range of infinity. That makes the blurred representation a characteristic feature which can be looked out for in a search for thick wiping streaks.

A blurred representation may admittedly be caused by other objects in the image, such as, for example, any smooth surface. However, a wiping streak on the windshield remains mainly in the same position whereas other objects that cause a blurred representation move over the image. Accordingly, tracking over a number of successive individual images may be employed to exclude those objects.

Using this detection model for a blurred representation, ReDiWiSt is able to detect thick wiping streaks even when no definitive light source is present in the image at a time when an individual image sequence is captured and processed in real time. In addition, it may be clearly seen from image 2402 in FIG. 24, in which a Canny algorithm was applied, that no wiping streak edges are detected in image 2402. Attempts made with other types of first order and second order edge detectors, each of which is applied at different thresholds, lead to the same result. This shows that it is not possible in the conventional systems to detect such a thick wiping streak and to give a definite indication that the wiper blade causing that thick wiping streak is in a poor condition. Conversely, in accordance with this exemplary embodiment, it is possible to detect such a thick wiping streak and to do so in a fairly robust manner using as a basis a different optical effect that a wiping streak causes on a windshield.

The hardware of an example system according to the present invention may include a monocular universal DAS camera with an additional, optional, control unit for synchronization of the wiper blade mechanism. The synchronization may be carried out in such a way that the wiper blade sweeps over the region opposite the FOV of the DAS camera immediately before individual image capture but not necessarily at each individual image. Even though this is not necessary, it is optimal since, as already mentioned in the foregoing, the optical effects caused by a wiper blade occur at a maximum and most clearly directly after a wiping movement of the wiper blade.

In the following, it is assumed that a region of a windshield is swept by a wiper blade in a good condition.

Figure 32:
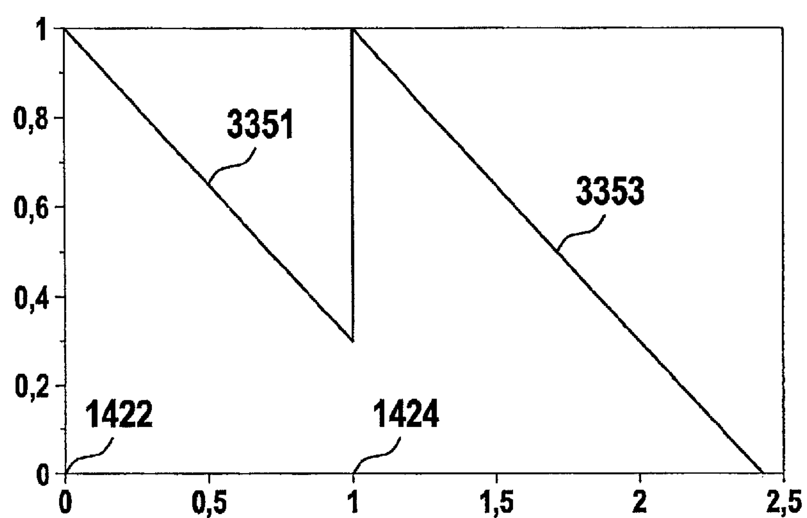
FIG. 32 shows a graphical representation of a fading behavior of light diffraction effects.

FIG. 32 shows a diagram in which time $t/t_0$ is entered on the abscissa and the diffraction pattern intensity $I/I_0$ is entered on the ordinate. The Figure shows a moment 1422 of the forward wiping movement and a moment 1424 of the backward wiping movement. Between times 1422, 1424, the diffraction pattern intensity extends with an inclination $-|E|$ 3351 and from time 1424 with an inclination $-|E|$ 3353. Inclination 3351 begins at a diffraction pattern intensity of 1 and falls to a value of 0.3. Inclination 3353 begins at a diffraction pattern intensity of 1 and falls to a value of 0. Thus, a deviation of the diffraction pattern intensity in relation to the wiping interval is shown.

FIG. 32 describes the behavior with time of the intensity of the diffraction pattern caused. t0 is the time that a wiper blade requires to move outward and back again over the POI, that is, the point at which the diffraction pattern in the image is observed. t=0 is the instant when the wiper blade has just moved over the POI, and the intensity of the diffraction pattern is at a maximum at $I_0$ since the microscopically small wiping streaks have only just formed here and have not yet evaporated. According to the handbook of the trade association for all those active in heating, refrigeration, ventilation and air-conditioning in the USA (ASHRAE=American Society of Heating, Refrigeration and Air Conditioning Engineers) PARSONS, Bob (ed.): ASHRAE Handbook: Heating, Ventilating, and Air-Conditioning Applications, American Society of Heating and Refrigerating, 1991, the evaporation rate E of a geometric body composed of water is given by $$E = \frac{(\propto + \beta \cdot V_w)(P_w - P_a)}{\Delta H_v} \quad (1)$$

where

E is the evaporation rate in kg/m2·hr, $V_w$ is the airspeed over a water surface in m/s, $P_w$ is the saturation vapor pressure at the water temperature in mm Hg, $P_a$ is the saturation vapor pressure at the dew point of air in mm Hg, $V_w$ is the airspeed over a water surface in m/s, $P_w$ is the saturation vapor pressure at the water temperature in mm Hg, $P_a$ is the saturation vapor pressure at the dew point of air in mm Hg, $P_w$ is the latent heat of water at the temperature of the water body in kJ/kg, and α and β are constants which change from one geometric body to another, but which may generally be specified in a rough estimation as being (α,β)=(42.6, 37.6).

Accordingly, E is a scalar for a set of approximation values for the above-mentioned parameters. Accordingly, the intensity falls linearly in the course of time, in the same proportion as the microscopically small wiping streaks evaporate in a similar manner, until at $t=t_0$ the wiper blade sweeps back over the POI and the intensity of the diffraction pattern caused jumps back to $I_0$ since, as a consequence of the backward sweep, new microscopically small wiping streaks are formed. Thereafter, and assuming that no further wiping movements will be carried out, the intensity pattern falls also linearly to zero in the same proportion as the wiping streaks evaporate in a linear manner (rate of $-|E|$). It should, however, be pointed out that, even in daylight, a diffraction pattern persists over several individual images before it becomes visually uncharacteristic, whereby the ReDiWiSt has more than enough time remaining to it, without requiring a control unit for a time synchronization of the wiper blade with the image capture rate of the DAS camera.

In towns and areas with a high dust density in the air, quartz particles in the dust cause the formation of scratches on the windshield glass which stem from the wiping mechanism of the wiper blades (see, e.g., DYAR, Melinda; GUNTER, Mickey E.; TASA, Dennis: Mineralogy and Optical Mineralogy. Mineralogical Society of America, 2007). Those scratches develop into a permanent multiple-slit structure which causes at a POI a one-dimensional diffraction pattern which is perpendicular to the structure at that POI, and more specifically even when it is not raining and the wiper blades are not activated. When such diffraction patterns are detected while the wiper blades are not activated, ReDiWiSt concludes therefrom, since they have a similarity to diffraction patterns caused by wiper blades on wiping, that is to say, at every given POI they are perpendicular to the wiping direction, that such diffraction patterns are attributable to a windshield that is in a poor condition owing to wiping of the wiper blades in an area with a high dust density in the air over a long period of time.

In accordance with one exemplary embodiment, a valuable function for the DAS beyond the functionality of assessing wiper blade and windshield condition is also provided. ReDiWiSt detects optical phenomena that are caused by targets on the windshield and that have not been produced by the scene lying in front. For example, diffraction patterns due to microscopically small wiping streaks caused by wiper blades in a good condition or caused due to glass scratches on a windshield in a poor condition cause in a stereovision DAS an erroneous disparity estimate at the mentioned diffraction patterns. A stereovision DAS is able, on capturing an image containing such microscopically small wiping streak-induced or glass scratches-induced diffraction patterns, for example of oncoming vehicle headlamps as shown in FIGS. 28 and 29, to assign disparities thereto which would indicate to the system that two huge posts are attached to an oncoming vehicle. That false assumption may lead to confusion in a DAS and to an abnormal behavior of an otherwise well thought out system. When detecting those mentioned diffraction patterns caused by the microscopically small wiping streaks or glass scratches on the windshield, ReDiWiSt provides the system with a fundamental understanding of the mentioned optical effect, thereby allowing the confusion and any errors resulting therefrom to be eliminated.

The approach described is suitable for use in every camera-based driver assistance system. It is capable of being put into effect with comparatively little expenditure since no additional hardware costs arise since implementation in software is possible.

The exemplary embodiments described and shown in the Figures have been selected merely by way of example. Different exemplary embodiments may be combined in their entirety or in respect of individual features. An exemplary embodiment may also be supplemented by features of a further exemplary embodiment. Furthermore, method steps according to the present invention may be repeated and may be performed in a different order from that described.

What is claimed is:

1. A method for automatically determining a wear condition of a vehicle component by recognizing directional structures on a window pane of a vehicle, comprising:

carrying out an assessment of image points of an image of at least a portion of the window pane, which image points are disposed along an evaluation path, a course of the evaluation path being dependent on an expected orientation of the directional structures on the window pane;

carrying out a determination of whether an image point disposed along the evaluation path constitutes a light diffraction effect in a region of the window pane represented by the image point;

recognizing a directional structure based on the assessment and the determination;

based at least on the determining, classifying a wear condition of the vehicle component; and based at least on the classifying, alerting a user of the wear condition.

2. The method as recited in claim 1, wherein the carrying out the assessment step includes determining whether an image point disposed along the evaluation path constitutes a contamination of a region of the window pane represented by the image point.

3. The method as recited in claim 1, further comprising:

carrying out a further assessment of image points of the image of the window pane, which image points are disposed along a further path, a course of the further path being approximately perpendicular to the course of the evaluation path, wherein, in the recognizing step, the directional structure is determined based on the assessment and the further assessment.

4. The method as recited in claim 3, wherein the course of the evaluation path is dependent on a wiping trajectory of a wiping edge of a wiping device for wiping the window pane.

5. The method as recited in claim 4, further comprising: ascertaining a condition of the wiping edge based on an item of information relating to the directional structure.

6. The method as recited in claim 5, further comprising:

carrying out a subsequent assessment of image points of a subsequent image of the window pane, which image points are disposed along the evaluation path, and recognizing a subsequent directional structure based on the subsequent assessment, and wherein, in the ascertaining step, the condition of the wiping edge is ascertained further based on an item of information relating to the subsequent directional structure.

7. The method as recited in claim 1, in the carrying out of the assessment, taking into consideration at least one of: i) slit diffraction effects and ii) refraction effects.

8. The method as recited in claim 1, wherein the directional structures are one of: i) scratches, ii) smears, iii) classified as scratches, or iv) classified as smears.

9. The method as recited in claim 1, further comprising:

determining at least one of: i) an extent of the directional structures, ii) a thickness of the directional structures iii) an orientation of the directional structures, iv) the spacing of the directional structures from one another, and v) differences of the directional structures from one another.

10. The method as recited in claim 1, further comprising:

analyzing the image points of the image of the window pane to recognize fogging on an inside of the window pane.

11. The method as recited in claim 1, wherein the directional structures are smears.

12. The method as recited in claim 11, wherein the smears are water smears.

13. The method as recited in claim 1, wherein the directional structures are scratches.

14. An apparatus for automatically determining a wear condition of a vehicle component by recognizing directional structures on a window pane of a vehicle, comprising:

an image capture device to capture an image of the window pane;

an implementation device which receives the image of the window pane from the image capture device and carries out an assessment of image points of the image of the window pane, which image points are disposed along an evaluation path, a course of the evaluation path being dependent on an expected orientation of the directional structures on the window pane, and carry out a determination of whether an image point disposed along the evaluation path constitutes a light diffraction effect in a region of the window pane represented by the image point;

a recognition device recognize a directional structure based on the assessment and determine the wear condition of the vehicle component based on the assessment; and an alert device to alert a user of the wear condition.

15. A non-transitory computer readable medium storing program code to automatically determine a wear condition of a vehicle component by recognizing directional structures on a window pane of a vehicle, the program code, when executed by an information system, causing the information system to perform the following steps:

receiving an image of at least a portion of the window pane from an image capture device;

carrying out an assessment of image points of the received image of at least a portion of the window pane, which image points are disposed along an evaluation path, a course of the evaluation path being dependent on an expected orientation of the directional structures on the window pane;

carrying out a determination of whether an image point disposed along the evaluation path constitutes a light diffraction effect in a region of the window pane represented by the image point;

recognizing a directional structure based on assessment;

based at least on the assessment, determining the wear condition of the vehicle component; and based at least on the determining, alerting a user of the wear condition.

* * * * *